United States Patent
Olsen et al.

(10) Patent No.: US 6,952,780 B2
(45) Date of Patent: Oct. 4, 2005

(54) SYSTEM AND METHOD FOR ENSURING SECURE TRANSFER OF A DOCUMENT FROM A CLIENT OF A NETWORK TO A PRINTER

(75) Inventors: Theis Olsen, Kastrup (DK); Rune Windfeld Bundesen, København (DK); Claes Christian Hougaard, København (DK); Trygve Thor Nordly, København (DK)

(73) Assignee: Safecom A/S, Bagsvaerd (DK)

(*) Notice: Subject to any disclaimer, the term of this patent is extended or adjusted under 35 U.S.C. 154(b) by 818 days.

(21) Appl. No.: 09/769,778

(22) Filed: Jan. 26, 2001

(65) Prior Publication Data

US 2002/0016921 A1 Feb. 7, 2002

Related U.S. Application Data

(60) Provisional application No. 60/178,712, filed on Jan. 28, 2000.

(51) Int. Cl.[7] ............................ G06F 11/30; G09C 3/00; H04N 1/44
(52) U.S. Cl. ...................... 713/201; 380/55; 380/243
(58) Field of Search .................... 713/201, 200; 380/243, 55

(56) References Cited

U.S. PATENT DOCUMENTS 5,559,933 A * 9/1996 Boswell ...................... 358/1.15
5,633,932 A * 5/1997 Davis et al. .................. 380/55
5,638,511 A    6/1997 Nezu
5,787,149 A    7/1998 Yousefi et al.

FOREIGN PATENT DOCUMENTS

EP    929 023     7/1999
WO    97/32274    9/1997

* cited by examiner

*Primary Examiner*—Andrew Caldwell
*Assistant Examiner*—Courtney D. Fields
(74) *Attorney, Agent, or Firm*—Jacobson Holman PLLC

(57) ABSTRACT

The present invention relates to a system and method for ensuring secure transfer of a document from a client of a network to a printer. That is providing a system and method enabling safe printing of a print job by securing a transmission of the print job through a network to a printer and only releasing the print job to a user designated by a client of the system and method to access the print job. Further, the present invention provides a system and method for distributing a document to a plurality of users while maintaining a secure transfer of information from the transmitting client to the plurality of users. Additionally, the present invention provides a system and method performing controlled discriminatory user access to a printer connected in a network by identifying users at the printer.

24 Claims, 6 Drawing Sheets

SYSTEM AND METHOD FOR ENSURING SECURE TRANSFER OF A DOCUMENT FROM A CLIENT OF A NETWORK TO A PRINTER

Priority from, and the benefit of, U.S. Provisional Application No. 60/178,712, filed Jan. 28, 2000, is hereby claimed.

The invention relates to a printing control system and a printing control method for ensuring secure transfer of documents from a client connected to a network such as a local area network (LAN) or a wide area network (WAN) to a user who is allowed access to the documents from a printing communication unit connected to a printer. The printing control system and printing control method provides means for a client station to designate a document to a single user or a group of users and provides the possibility for the single user or the group of users to access the document at a plurality of printer communication units.

The state of the art provides several techniques for enabling a client the opportunity to share documents and directories with other clients connected to a network. Thus the state of the art provides other clients connected to a network to access a document and perform printing of the document either locally or at any printer accessible through the network. However, the state of the art fails to perform a secure transfer of the documents provided by the sharing client since the documents may be printed at any printer connected to the network and at any time according to the selected printer's job queue. Hence the user of the network may transmit a shared document as a print job to the printer's job queue without knowing when the printer actually prints the shared document and consequently the shared document may lay open to inspection by anybody at the printer.

In sharing a document or directory in the state of the art network system, the client sharing a document or directory may determine which clients of the network are allowed access to the shared document or shared directory. The state of the art network system, however, does not inform the sharing client which client or clients in the network have actually accessed the shared document or directory. Neither does the state of the art network system provide billing of the accessing clients when the shared document is opened or printed. Generally the state of the art network system provides the opportunity to share documents with designated users or clients of the network system without providing client's access times, clients accessing the shared document and accounting information to the sharing client.

A method and apparatus for managing remotely located document producing machines by using cellular radios is described in U.S. Pat. No. 5,787,149 hereby incorporated by reference in the patent specification. The US patent discloses an apparatus for managing a series of document producing machines such as printers, copiers or faxing machines by recording and transmitting use of the machines to a managing unit so as to provide a vendor leasing the machines to lessees with a picture of how much the machines are used. The vendor may then utilise the information transmitted from the machines to bill the lessees according to the lessees' use. The apparatus described in U.S. Pat. No. 5,787,149 provides billing of a lessee in accordance with use of a leased document producing machine, however, the apparatus does not provide means for billing separate users having access to the leased document producing machine for producing prints of documents on the leased document producing machine.

An object of the present invention is to provide a system and method enabling safe printing of a print job by securing a transmission of the print job through a network to a printer and only releasing the print job to a user designated by a client of the system and method to access the print job.

A further object of the invention is to provide a system and method for distributing a document to a plurality of users while maintaining a secure transfer of information from the transmitting client to the plurality of users.

A particular advantage of the present invention is the provision in the system and the method of controlled discriminatory user access to a printer connected in a network by identifying users at the printer.

A particular feature of the present invention is the provision in the system and the method of an account or credit for each user so that the each user is allowed printing operations at the printing in accordance with user credit.

The above object, advantage and feature together with numerous other objects, advantages and features which will become evident from the below detailed description of a preferred embodiment of the present invention is according to a first aspect of the present invention obtained by printing control system for ensuring one or more users of a network (such as a LAN: local area network, or a WAN: wide area network) secure access to a print job designated to said one or more users of said network, and said printing control system comprising:

(a) a client station of a first plurality of client stations for designating said print job to said one or more users, said print job defining a document containing user readable information and defining a header containing document access information, (b) a spool connected to said client station for spooling of said document and substituting said document in said print job with a spooled document, (c) a job database connected to said spool for receiving said spooled document and said header from said client station, said job database defining a document table and a user table and storing said spooled document in said document table and storing said header in said user table, (d) a printer communication unit of a second plurality of printer communication units for receiving user identifying data input by said one or more users to said printer communication unit, (e) a server managed by a network administrator and interconnecting said printer communication unit to said job database for establishing said one or more users in said user table enabling said one or more users access to said network, for validating said one or more users on the basis of said user identifying data input to said printer communication unit against user information stored in said user table, and for ensuring said user identifying data and said user information provide said one or more users access to said spooled document, (f) a printer connected to said printer communication unit for receiving said spooled document from said job database and having a request input for receiving a print request from said one or more users and communicating said print request to said server, and (g) a print engine interconnecting said job database and said printer communication unit for compiling of said spooled document to be communicated to said printer through said printer communication unit, said print engine receiving said spooled document from said document table in said job database.

According to the basic realisation of the first aspect of the present invention the printing control system enables a plurality of client stations to designate a data file or document to a plurality of users accessing the printing control system by identifying themselves at any printer connected to the network. Thus providing a secure transfer of the data file or document designated to one user or a plurality of users from any of the client stations connected to the network by determining the identity of each user requesting a print of the data file or document. The transfer is further secured by encrypting the document before transferring the document through the network by utilising either a public encryption key or private encryption key.

The term one or more users as applied in this context should be construed as an individual user, a population of users, a plurality of users, a multiplicity of users or group of users, or an individual user in the said population of users.

The one or more users of the printing control system do not necessarily have to be provided with or have access to an individual client station, since the one or more users may simply have access to the print jobs display at the printer communication unit but access to designate print jobs. The printing control system may therefor ideally be utilised for distributing information such as working schedules, tasks or any other type of information to employees having no access to an individual client station in the network but entirely access to the printer communication unit. This may be employees such as machining tool operators, medical personal, sales assistance or chauffeurs not needing a personal computer or the like for performing their daily work. These employees may collect their daily tasks from a printer communication unit positioned at any location accessible to the employees.

The secure transfer of the document and further communication between elements of the printing control system is provided on the network is established by bus connections, by cable connections such as current carrying cables and/or optical cables, by wireless links such as mobile radio transmission links, infra-red transmission links or ultra-sonic transmission links, or by any combination thereof. By utilising bus connections between some or all elements of the printing control system a particular fast communication is achieved. However, generally communication between elements of the printing control system is performed on a wide variety of connections thus providing a very dynamic communication system.

Utilising mobile radio transmission links as for providing at least part of the network communication ensures a printing control system of great versatility, since the printing control system as such become mobile and client station may access the network from any position within range of a mobile radio transmitter station.

The communications between elements of the first aspect of the present invention comprises control signalling and document transfer. The document is constituted by a file configured in any binary format such as text format, comma or space separated variable format, or any user or software-defined format. By employing a printing control system accepting any binary file format provides a great advantage since it enables communication between two otherwise non-compatible systems is achieved. The header contains information such as information regarding data stream format such as PostScript, PDF, IPDS, PCL, PCLXL or AFP format, print formats such as simplex, duplex, colour, page size, page rotation, tray, stapling, number of pages of the spooled document, access for said one or more users to said spooled document, a digital client signature, duration in which the one or more users are allowed access to the spooled document, and number of pages defined by the spooled document or any combination thereof. The header ensures that the user table is updated with relevant information regarding which users are allowed access to the spooled document.

Further in accordance with the first aspect of the present invention each of the first plurality of client stations comprise a local memory, a display, a keyboard and preferably a local central processing unit such as constituted by personal computers, computer workstations and/or such as constituted by mobile communication clients like mobile phones or mobile communicators or any combinations thereof. Generally the first aspect of the present invention may be established incorporating a wide variety of client station types thus ensuring communication and transfer between various client types.

The spool provided for in the first aspect of the present invention performs spooling of the document according to a data stream format such as to PostScript, PDF, IPDS, PCL, PCLXL or AFP format. The printing control system allows for any data stream format to be utilised, hence ensuring further that generally a wide variety of printer types may be connected to the printing control system.

The printing control system establishes a secure network by utilising secure networking procedures providing symmetrical and/or asymmetrical encryption in accordance with public and/or private encryption keys. The encryption provided by the spool enhances security of the transmission between client stations connected in the network.

Additionally, the spool incorporates a port monitor for parsing the spooled document in order to determine data stream format such as PostScript, PDF, IPDS, PCL, PCLXL or AFP format, and further to determine print formats such as simplex, duplex, colour, page size, page rotation, tray, stapling, and number of pages the spooled document will constitute during printing of said spooled document. The page count is utilised for determining the price for performing a print of the spooled document at any printer connected to the network.

Further, in accordance with the first aspect of the present invention the job database is established on a memory storage unit accessible by the server such as magnetic storable hard disk, magnetic storable tape and/or magneto-optic storage disks on the server having the user table and the document table allocated in storage spaces on the memory storage unit. Further, the user table allocates a record space in the memory storage unit for the header, and the document table allocates a storage space in the memory storage unit for the spooled document. Alternatively, the user table allocates a record space in the memory storage unit for the header, and the document table allocates a storage space in the memory storage unit for a pointer to the spooled document on the local memory of the client station or in the document table. It is further possible to implement the server incorporating the spool, the job database and the print engine in a server memory. Thus providing a system which may utilised a bus hence significantly increasing processing and transmission times between elements of the present invention.

Any of alternative the above mentioned types of storage media may serve as a memory storage unit, hence the first aspect of the present invention ensures compatibility between new and older communication systems and additionally, provides a choice of storage media in accordance with the necessary capacity of the printing control system.

The printer communication unit according to the first aspect of the present invention comprises a front-end module for identifying the one or more users of the network and a control unit for providing an interface for the print engine and the server to the printer. In order to accomplish communication between the user and the printer communication unit the front-end module comprises a display for showing the user accessible print jobs and operations menus, and comprises a keypad for providing an interface between the user and the front-end.

The display according to the first aspect of the present invention utilises cathode-ray tube screen techniques or the display utilises liquid crystal display techniques. Either type of display provide high resolution clear visual graphic interfaces for the user. The keypad is constituted by a general personal computer keyboard, a numerical keypad or a functional keypad or constituted by a touch sensitive film mounted on the display so as to allow the user to perform user operations by pressing the touch sensitive film in accordance with information showed on the display. Utilising a touch screen further enhances the graphics interface between the user and the printer communication unit.

The front-end module according to the first aspect of the present invention comprises a iris scanner, a fingerprint reader for identifying the one or more users at the front-end module and/or preferably a card reader for reading card information from a card such as a credit card, a library card, a health insurance card, a driving licence card, a passport card, a membership card, a company identity card or an institutional identity card. The card information includes information such as card user name, card user ID, card user credit, card user's access rights, card user's server address, card user identifying number, card issuing date, card identity number, digital signature of one or more of said client station of said first plurality of client stations or any combination thereof. The card reader receives card information from the card and communicates the card information to the server. The front-end module requests a first user pin code.

Further, in accordance with the first aspect of the present invention the card utilises electronic storage techniques, electro-magnetic storage techniques, magnetic storage techniques, magneto-optic storage techniques, optic storage techniques or any combinations thereof for storing of the card information.

The user identifying data includes the card information and the first user pin code and the user information stored in the user table includes system user name, system user ID, system user credit, system user's access rights, system user's server address, system user identifying number, system user PUK code (personal user key), system user initiation date or any combination thereof, and a second user pin code. The control unit transmits upon receipt of the first pin code the user identifying data to the server for verification. This transmission is accomplished by the control unit communicating with the front-end module and the printer through a parallel connection, a serial connection, a local area network (LAN) connection, a wireless connection such as a mobile radio transmission connection, an infra-red transmission connection or an ultra-sonic transmission connection, or any combination thereof.

The user identifying data includes the card information and a first user pin code and the user information stored in the user table includes system user name, system user ID, system user credit, system user's access rights, system user's server address, system user identifying number, system user PUK code, system user initiation date or any combination thereof, and a second user pin code. The server establishes and validates the one or more users by identifying the user information in the user table on the basis of the user identifying data and by matching the first pin code with the second pin code. Alternatively, during first use of the card by matching the system user PUK code with an entered user PUK code and the server locating in the document table all print jobs designated for the one or more users and communicating titles of all print jobs designated for the one or more users to said front-end display enabling the one or more users to select a print job or a multiplicity of print jobs.

Hence the server performs the verification of user identifying data by comparing the first pin code transmitted from the control unit with the second pin code attached to the user information stored in said user table. Furthermore, the server locates in the user table all print jobs designated for the user and communicates titles of all print jobs designated for the user to the front-end display enabling the user to select a print job. When the server has verified the user then the user may select any of the listed available print jobs and perform various operations on the available print jobs.

As the server receives a print job selection from the one or more users at the front-end module and the server provides the one or more users access to the spooled document in the document table in the job database upon validation of the user identifying data.

Subsequently the server provides an opportunity for the one or more users to delete the spooled document from the one or more users' print job list, determine desired number of copies required of the spooled document, retain printing of the spooled document in a draft version for a first price, view the spooled document on the display for a second price, print the spooled document on the printer for a third price and terminate further operations on the front-end module. The price of these optional operations allowed the user at the printer communication unit might be determined in accordance with various criteria. For example the price for printing of the spooled document may be different for each user depending on number of copies taken of the spooled document or depending on who the author of the particular spooled document is. Further the price might be based on the relative to for example artists royalty fees such as for example Koda-Gramex fees.

The server deducts the credit of the one or more users of a first amount equal to the first price if the one or more users prints a draft version of the spooled document, a second amount equal to the second price if the one or more users views the spooled document and a third amount equal to the third price if the one or more users prints the spooled document or the server establishes a client credit record for each of the client stations designating the one or more users and deducts the client credit record of a first amount equal to the first price if the one or more users prints a draft version of the spooled document, a second amount equal to the second price if the one or more users views the spooled document and a third amount equal to the third price if the one or more users prints the spooled document. Thus the client station designating a particular print job to a group of the one or more users of the network will be charged in accordance with the document type and in accordance with how many of the designated user prints the print job. For example a bookstore may have access to a printing control system through a printer communication unit and each time the bookstore wishes to sell a copy of a document designated to that book store the book store may perform a print job. Subsequently the bookstore will be charged either daily, weekly, monthly or yearly for the number of copies the bookstore has performed of the print job. The bookstore or generally users are provided with a wide range of options of operations allowing the users to select at wide variety of operations, which accordingly will be debited the users upon termination of operations. The printer communication unit may obviously be constituted by a personal computer, a work station, a mobile communicator or a mobile phone.

The above object, advantage and feature together with numerous other objects, advantages and features which will become evident from the below detailed description of a preferred embodiment of the present invention is according to a second aspect of the present invention obtained by a printing control method for ensuring one or more users of a network (such as a LAN: local area network, or a WAN: wide area network) secure access to a print job designated to said one or more users of said network, and said printing control system comprising:

(a) designating said print job defining a document containing user readable information and defining a header containing document access information to said one or more users by means of a client station of a first plurality of client stations, (b) spooling of said document and substituting said document in said print job with a spooled document by means of a spool connected to said first plurality of client stations, (c) receiving said spooled document and said header from said client station at a job database connected to said spool, defining a document table and a user table in said job database and storing said spooled document in said document table and storing said header in said user table, (d) receiving user identifying data input by said one or more users to a printer communication unit of a second plurality of printer communication units, (e) establishing said one or more users in said user table enabling said one or more users access to said network, validating said one or more users on the basis of said user identifying data input to said printer communication unit against user information stored in said user table, and ensuring said user identifying data and said user information provide said one or more users access to said spooled document by means of a server managed by a network administrator and interconnecting said printer communication unit to said job database, (f) receiving said spooled document from said job database and having a request input for receiving a print request from said one or more users at a printer connected to said printer communication unit and communicating said print request to said server, and (g) compiling of said spooled document to be communicated to said printer through said printer communication unit by means of a print engine interconnecting said job database and said printer communication unit, receiving said spooled document at said print engine from said document table in said job database.

The printing control method according to the second aspect of the present invention incorporates above described features, described with reference to the printing control according to the first aspect of the present invention.

DETAILED DESCRIPTION OF THE PRESENT INVENTION

In the following the printing system according to the preferred embodiment of the present invention will be described in detail with reference to the figures listed above.

Figure 1:
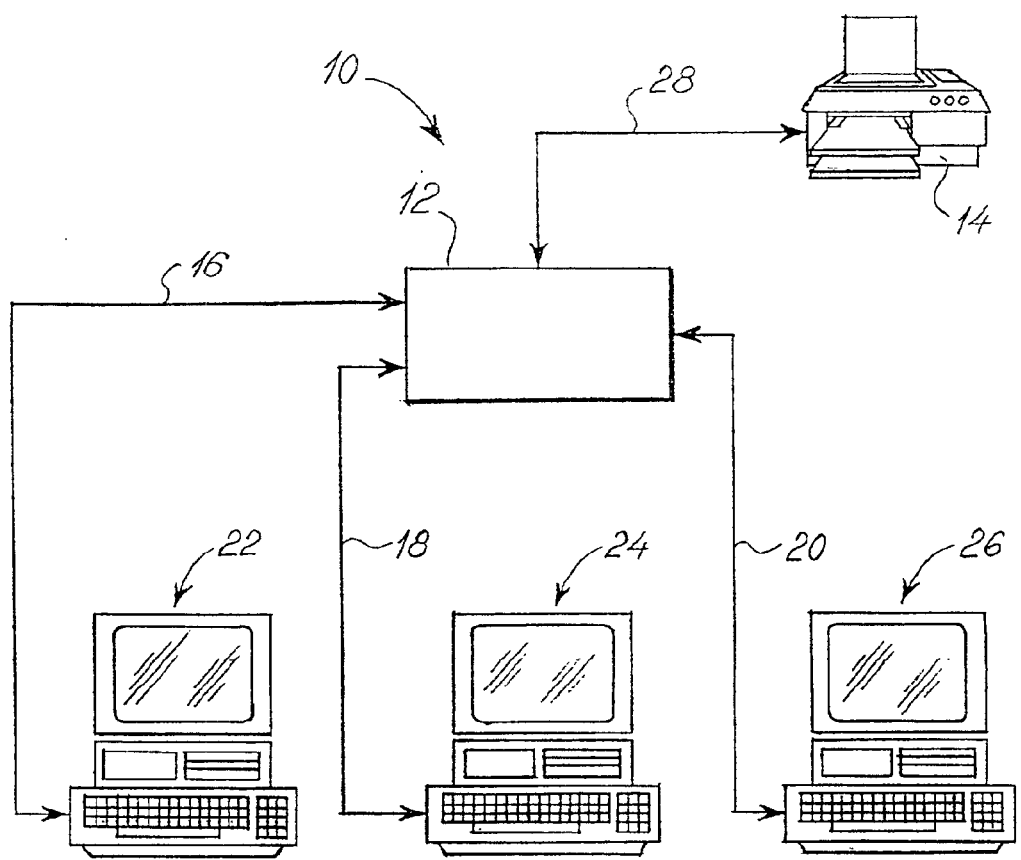
FIG. 1 shows a schematic overview of a prior art communication network enabling remote printing.

FIG. 1 shows a schematic example of a prior art communication network designated by numeral 10 in its entirety. The communication network 10 provides communication between individual clients or personal units designated in their entirety by numerals 22, 24 and 26. Each of the individual clients or personal units 22, 24 and 26 comprise a local memory for storing of data files. The communication between the clients 22, 24 and 26 is executed and controlled by a server 12 connected to each of the clients 22, 24 and 26 through connections 16, 18 and 20. Additionally, the server 12 may further be connected to a printer 14 through connection 28.

The server 12 may be configured so as to allow all clients access to the printer 14. Alternatively, the server 12 may be configured so as to allow a specific client of all clients 22, 24 and 26 connected in the communication network 10 access to the printer 14 and additionally simultaneously deny all other clients access to the printer 14. Likewise any particular client, for example the client 22, may be configured to allow any specific or both the clients 24 and 26 access to a specific part of the client's 22 local memory so that both clients 24 and 26 or a specific client is allowed access to data files stored on that the client 22.

Figure 2:
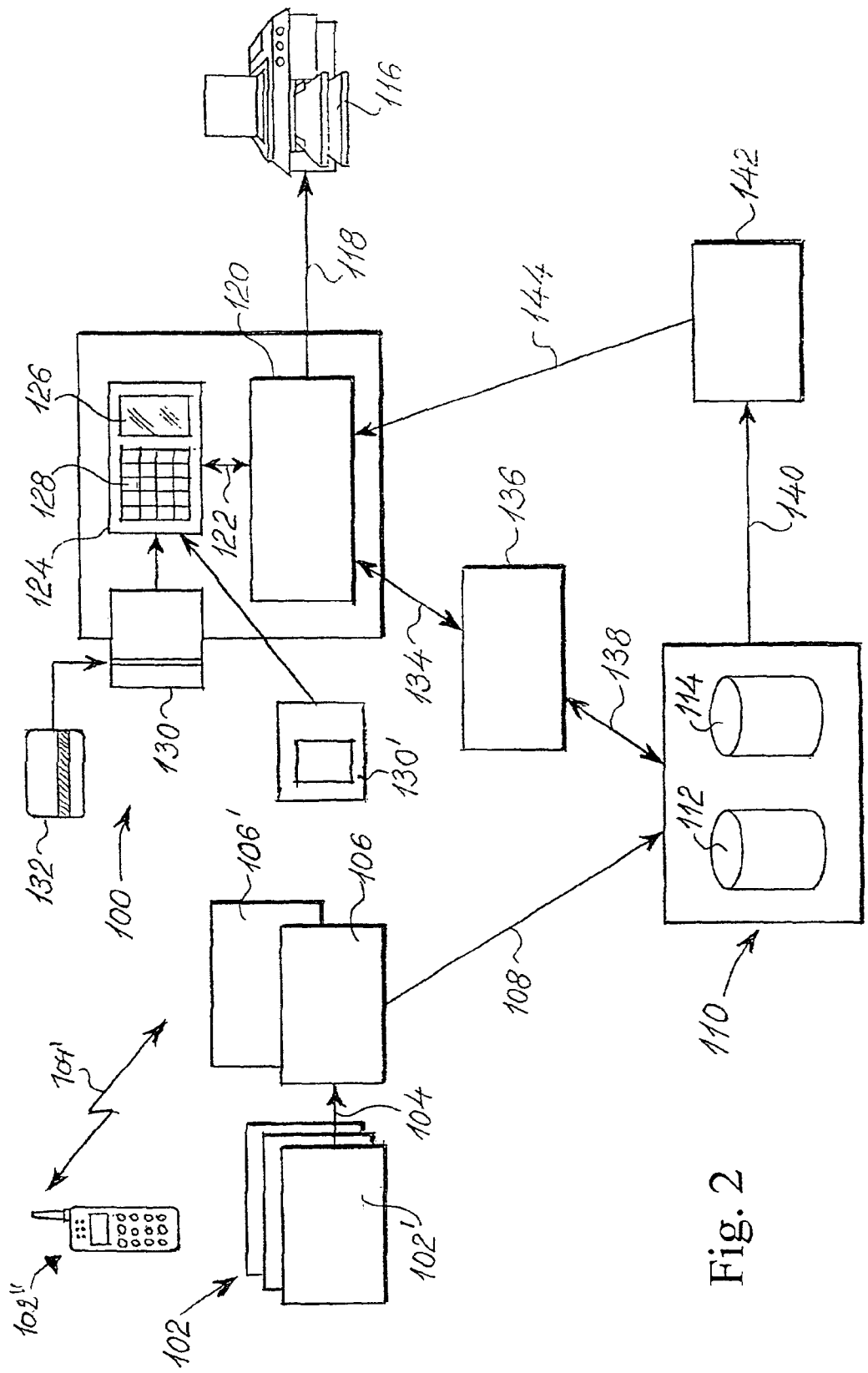
FIG. 2 shows a schematic overview of a printing control system enabling exclusive printing from any printer connected to a network.

FIG. 2 shows schematic overview of a printing control system in accordance with a preferred embodiment of the present invention, which printing control system is designated in its entirety by numeral 100. The printing control system 100 enables any client 102' of a plurality of clients 120 connected in a local area network (LAN) or a wide area network (WAN) remote printing of data files.

The client 102' utilises a spool 106 for compiling of a data file in accordance with a particular printing format. The spool 106 receives the data file through a connection 104 between the client 102' and the spool 106. The client 102' or the plurality of clients 120 in the preferred embodiment of the present invention may be constituted by a mobile phone 102" of a plurality of mobile phones or cellular phones to be configured as clients. The mobile phone 102" transmits the data file through a wireless connection designated by numeral 104' to a receiving spool 106'. The spooling operation may be performed by any general printer driver facility provided in any operational system such as Linux, Unix System V, Windows or Windows NT or spool systems on AS/400 or S/300 midrange and mainframe respectively. The client 102' may further perform an encryption of the data file by means of a port monitor running on the client 102' so as to ensure that the data file is secure and safe against any violation or unintentional disclosure of the contents of the data file to intruders.

The spool 106 establishes a print job by communicating the secured and spooled data file through a connection 108 to a job database 110 comprising a document table 112 and a user table 114. The document table 112 lists a plurality of established print jobs each containing the transferred secured and spooled data file (a print job document) or alternatively containing information regarding position of the secured and spooled data file in the document table 112 or on the local memory of the client 102'. Each record (a print job header) in the user table 114 contains information regarding an encryption key either public or private key, users allowed by the client 102' to perform the print job or alternatively users disallowed by the client 102' to perform the print job, and status of the present print job (print job header). The client 102' may at any time retrieve information from the user table 114 for determining if the data file is printed and in case it has been printed which user has or which users have printed the data file. In the print by reference system the user indicates a memory location of the print job on the local memory of the client 102' in a LAN or a WAN and as soon as the printing control system 100 identifies and verifies a user the secured and spooled data is decrypted and communicated to a printer 116.

The printer 116 enables printing of the print job document listed in the document table 112. The printer 116 is connected through a printer cable or a network connection 118 to a control unit 120. The printer cable 118 may constitute a serial connection or preferably the printer cable 118 constitutes a parallel connection between the control unit 120 and the printer 116. The control unit 120 is further connected through a link 122 to a front-end module 124, which comprises a display 126, a keyboard 128, a card reader 130 and/or a unit 130' for scanning irises or reading fingerprints. The display 126 provides guidance to the users and may be implemented by a general cathode-ray tube screen or in the preferred embodiment of the present invention the display 126 is constituted by a liquid crystal display (LCD). The keyboard 128 in combination with the card reader 130 enables any user of the printing control system 100 to identify themselves to the front-end module 124. The keyboard 128 may be any standard personal computer keyboard, a numerical keypad, a function keypad or any combinations thereof. In an alternative embodiment of the present invention a touch screen film mounted on the display 126 may constitute the keyboard 128.

The link 122 between the front-end module 124 and the control unit 120 may be constituted by a parallel connection or in the preferred embodiment of the present invention the link 122 is constituted by a serial connection. In case the front-end module 124 and the control unit 120 are incorporated into the printer 116 an internal bus may constitute the link 122.

Every user of the printing control system 100 has a card 132 for identifying the particular user at the front-end module 124. The card 132 may include information stored there upon by applying magnetically storage, electrically storage or any combinations thereof. In an alternative embodiment of the present invention the card 132 may include information stored there upon by applying optically storage or magneto-optically storage. The information stored on the card 132 may be name of user, password for user, user certificate, total number of print jobs allowed, executed number of print jobs, total number of allowed pages to be printed and total number of printed pages. Further the card 132 may contain information regarding specific access to particular issuers or clients writing to the LAN or WAN. Alternatively, the card 132 may be constituted by a credit card holding information regarding identity of cardholder and financial credit. Means for identifying the user of the printing control system 100 may further be implemented through non-card authentication such as finger print or iris identification.

By presenting the card 132 to the card reader 130 the front-end module 124 may determine the identity of the cardholder and request a pin code from the card holder in order to ensure a match between the cardholder and the certified user of that particular card 132.

The control unit 120 is connected through a connector 134 to a server 136 carrying out requests issued by the control unit 120. The server 136 being connected through a connector 138 further provides an interface between the job database 110 and the control unit 120. The interface ensures that the control unit 120 may communicate with any selected database. The server 136 may be connected to a plurality of control units similar to the control unit 120 either through a LAN or WAN thus enabling printing of a data file to be performed at any control unit connected through the LAN or WAN. Thus a secure and safe transmission of data files between two or more locations is achieved as soon as a user allowed to access the print job has been verified.

When the client 102' communicates a print job to the job database 110 by transmitting a secured and spooled document to the document table 112 of the job database 110, then the client 102' additionally communicates a header associated to the secured and spooled document, which header contains information regarding which users have access to perform a print of the secured and spooled document and is transferred to the user table 114.

A user may log on to the printing control system 100 according to the preferred embodiment of the present invention at any front-end module by introducing the user's card 132 into the card reader 130 and entering the user's pin code. The front-end module 124 subsequently verifies the user's identity by checking the pin code. If the pin code is not in accordance with the pin code registered in the server 136 for that particular user, then the display 126 informs the user that access is denied. On the other hand if the pin code is in accordance with the pin code registered in the server 136 for that particular user, then the front-end module 124 requests print jobs from the control unit 120. However, only print jobs, which the particular verified user is allowed to perform. The control unit 120 in turn requests this information from the server 136 checking the user table 114 in the job database 110. The verified user may then view a document list, select to printing of any of the print jobs or viewing any of the print jobs on the display 126, which print jobs are designated to the verified user. In case the verified user selects printing of a print job then the job database 110 communicates the print job through a connection 140 to a print engine 142. The print engine 142 enables the control unit 120 to upload the print job containing an secured and spooled data file through a connection 144 and subsequently enables the control unit 120 to further communicate the secured and spooled data file to the printer 116 so as to complete the print job.

A print log record is kept for each print job in the job database 110. The print log record lists users who have printed or viewed the print job, lists which front-end module 124 and which printer 116 was utilised for each particular user viewing or printing the print job, and lists the time and date for each particular user viewing or printing the print job. A port monitor incorporated in the spool 106 parses the print job document in order to count the number of pages to be printed by the printer. A small postscript application is transmitted to the printer 116 before and after performing printing of the print job thus inquiring the printer 116 before performing the print job and subsequent to performing the print job of the hardware page count. The resultant page count of the print job is then introduced into the print log record. In conjunction with performing a hardware count of printed pages specific user defined billing categories may be introduced in the print log record so as to determine a price for performing the print job. The price may vary as a function of number of pages printed in the print job or in fact the number of copies of the print job performed by the user and may further include a special price for viewing a print job. The print log record may be exported to the client 102' in any required file format such as comma separated format, space separated format, in text format or simply in binary format.

In the preferred embodiment of the present invention the user is, as described above, charged according to the number of pages the user prints, therefor the card issued to the user contains a maximum allowable number of printed pages. The number of printed pages for each card 132 is continuously monitored by the server 136 and the server 136 handles payments for the users printing or viewing of the print job. The price for performing a view or a print of a document may differ between users of the network in accordance to various agreements between the author of a document and the reader of that document e.g. in accordance with copyright agreements. Each specific user may at the front-end module 124 view his status account or credit and view printing costs for printing of the print job. If the specific user has no credit the server 136 will prevent the specific user from accessing the printing control system 100.

In addition to having general printers connected to the printing control system 100, the printing control system 100 further enables connecting copying machines to the LAN or WAN. The printing control system 100 tracks and logs copy clicks from copying machines when a user is identified at a copying machine. The documents in the job database 112 may be accessed at the copying machines by importing the documents to the copy machine in a variable file format.

The server 136 may be connected through a WAN to a plurality of servers and thus enable communication of print jobs and print log record information between the plurality of servers and the server 136. Thus the printing facilities provided by the server 136 is extended to the plurality of servers thereby introducing a safe wide printing control system for distribution of print jobs and cost of performing print jobs.

The client 102' may according to preferred embodiment of the present invention be constituted by personal computers, computer workstations or in an alternative embodiment of the present invention constituted by a combination of personal computers, computer workstations and mobile communication clients such as a mobile phone or a mobile communicator. The connections provided in the printing control system 100 is constituted by connections such as current carrying cables and/or optical cables or in an alternative embodiment of the present invention by mobile radio transmission links or by any combination of current carrying cables, optical cables and mobile radio transmission links.

Figure 3:
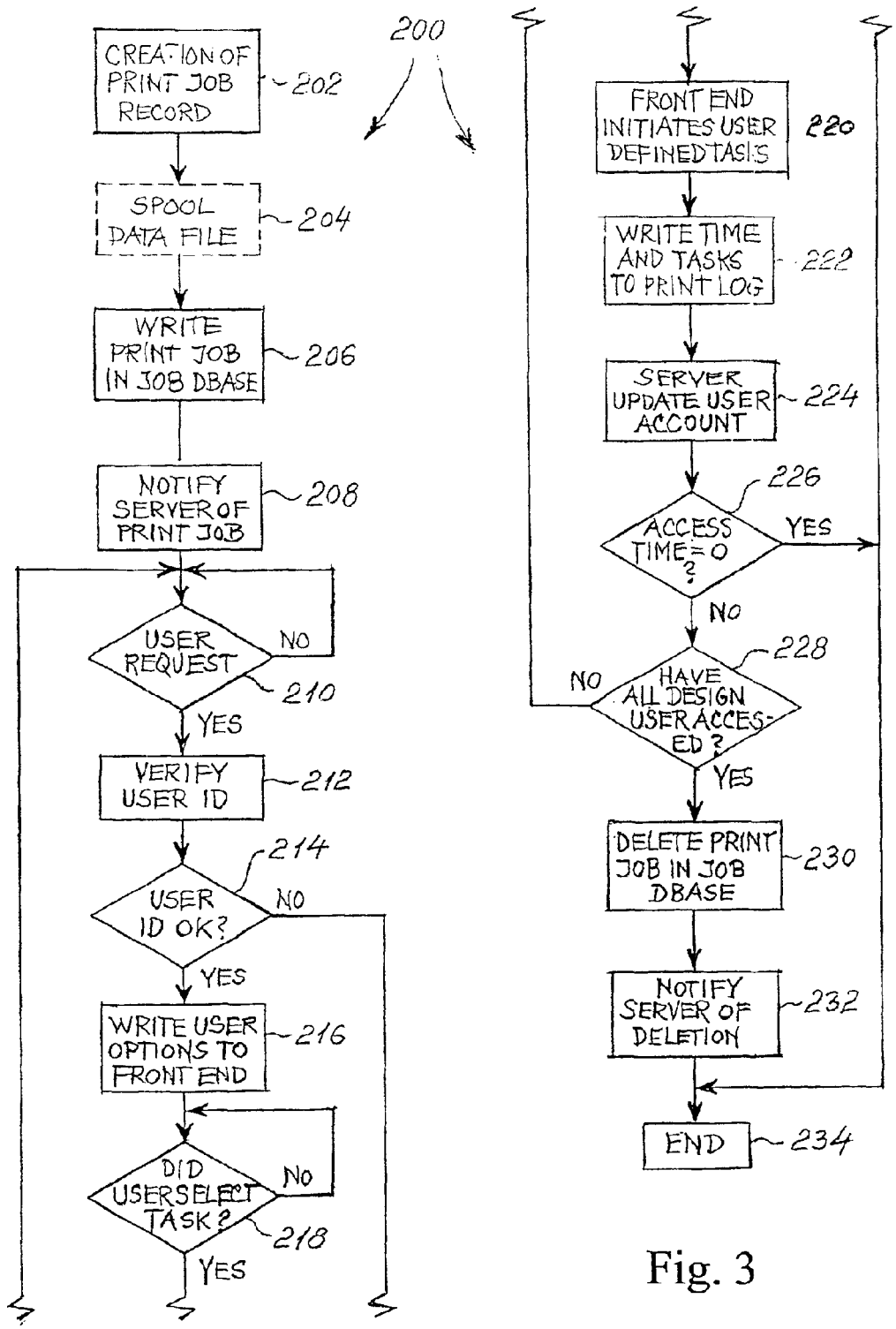
FIG. 3 shows a principal flow diagram of a method for providing exclusive printing from any printer connected to a network.

FIG. 3 shows a principle flow diagram designated in its entirety by numeral 200 and describing the operations of the printing control system according to the preferred embodiment of the present invention. The flow diagram 200 is shown as a sequentially evolving system for explanatory reasons only, the preferred embodiment of the present invention, however, provides a system performing parallel operations. Some operations are concurrently performed by the client 102', the server 136 and by a printer communication unit constituting the control unit 120, the front end 124 and the card reader 130. The term parallel operation is in this context to be construed as performing concurrent operations, a multiple of operations simultaneously or as performing real time operations.

In block 202, shown in the flow diagram 200 a plurality of clients create a number of print job records at any time. The print job record consists of a data file or document or alternatively a pointer pointing to an address of the data file or document to be transferred to any designated user of the printing control system. The print job record further consists of a user file or header associated with the data file or document to be transferred through the printing control system, which user file or header includes information regarding users defined as designated users allowed access to the document, time during which the designated users are allowed access to the document and/or an address pointer to the document.

When the printing control system according to the preferred embodiment of the present invention transfers data from one unit or element to the next in the printing control system the data is transferred utilising secure networking procedures providing either symmetrical encryption and/or asymmetrical encryption. Thus the printing control system provides a safe communication between the plurality of clients and the designated users of the printing control system.

In block 204, the data file or document is spooled providing a document in a printer readable format. The spooling operation is performed at each client or in an alternative embodiment of the present invention at the server. Since in the preferred embodiment of the present invention the client performs the spooling operations a plurality of spooling operations may be performed simultaneously at each client.

As the data file or document is spooled the print job is transferred to the job database in block 206. The document is written to a document table and the user file or header is written to a user table, which document table and user table is described with reference to FIG. 2. In the printing control system according to an alternative embodiment of the present invention the user file or a header contains a pointer addressing the document in a storage medium at the client. The client provides the document to designated users of the printing control system upon request from a designated user. In this alternative embodiment the print job is written to the user table since the user file or header contains all necessary information for the printing control system to extract the document from the client.

In block 208, the server is notified of the existence of a print job transferred from any of the plurality of clients in the printing control system. Subsequently the server enters a waiting mode with respect to the particular print job shown as question block 210. The server waits for any user to request the particular print job at any printer connected in the printing control system. If a user performs a request for any print job at any of the printer communication unit connected in the printing control system, then the server initiates a verification of the requesting user shown as block 212 by correlating user log on information with user information stored in a server memory.

In block 214, the server determines whether the user should have access to the printing control system and provided the user log on information does not correspond with the user information stored in the server memory the user request is denied. Alternatively, the server transfers user options for the requesting user shown in block 216 to the printer communication unit. The user options provided to the requesting user vary for each requesting user in accordance with assigned options for each requesting user in the user table. The user options may be: List accessible print jobs, Select print job, View print job, Print print job, Show user account, Show number of pages of selected print job, Delete selected print job, Mark print job as not-deleteable, Display information about print job such information as duplex, simplex, colour, name, size, date, data-stream (PostScript, PDF, PCL, PCLXL, IPDS or AFP format), expiration data and End.

In block 218, the server waits for the requesting user to select one of the options provided to him. During this waiting session shown as block 218 the server performs alternative operations while continuously monitoring the printer communication unit for a selection. When the requesting user has selected which operations to perform the server initiates the user-defined operations at the first available possibility, shown in block 220. The operations may be performed by the printer communication unit or by any printer connected to the printer communication unit.

The selection made by the requesting user and the time for the request is written to a print log file during block 222. This operation may be performed subsequent to the requested tasks or concurrently to the requested tasks. Additionally, the server updates a user account in accordance with the selected operations and with a predefined price for the requesting user for the particular selected operations during block 224.

The server monitors the operations performed on each print job and sets a flag or provides a signal when the print job according to the user file or header associated with each print job is or rather should be concluded. In case the time in which the print job should remain accessible to the designated users of the printing control system according to the preferred embodiment of the present invention has expired the server sets the flag. In block 226, the printing control system performs a check for whether the flag is set by the server.

If the flag is set then the operations performed on the associated print job are terminated. If on the other hand the flag is not set then the printing control system continues to examine whether all designated users have accessed the print job, shown in block 228. In case not all designated users have accessed the print job the printing control system returns back to the questioning block 210. Alternatively the printing control system deletes the print job from the job database in block 230, notifies the server of the deletion of the print job in block 232 and terminates further operations on the print job in block 234.

EXAMPLE

The preferred embodiment will below be described with reference to an example implemented in accordance with the presently preferred specification.

Software Design Specification

General

This design specification describes the modules and interfaces used by the software components of the "SafeCom Accounting" system. The project is based on software, described as "SafeCom" software. Except if explicitly noted herein, all functionality and behavior implemented in "SafeCom" applies to "SafeCom Accounting".

| Abbreviations | |
|---|---|
| GUI | Graphics User Interfaces |
| TCP/IP | Transmission Control Protocol/Internet Protocol |
| LPR/LPD | Line Printing/Line Printing Daemon |
| SQL | Structured Query Language |
| UDP | User Datagram Protocol |
| SS | SafeCom Server |
| PE | Print Engine |
| JDB | Job Database |
| CU | Control Unit |
| FE | Front End |
| AdmGUI | SafeCom Administration Tool |

Brief Product Description

The SafeCom product in itself concerns the implementation of a technique that ensures that a printed document is held until the designated receiver chooses to print it on the printer where she stands.

This project will improve the SafeCom product, with accounting capabilities based on the page-count of the physical printer. Moreover this project will implement two new mechanisms respectfully called "Billing" and "Distribution". As a new facility, the install program will give the user opportunity to install a secure client for Win95 and Win98.

Configuration will still be maintained through the Win32 based administration GUI. It will be enhanced with capabilities of exporting data from the new accounting database, and performing simple data mining in the collected data. It should also be possible to import the user database from WinNT for easy administration of the SafeCom system, this last facility will be implemented if time permits it.

The AdmGui of "SafeCom Accounting" will be Win2000 compliant, all other components cannot be guaranteed to be Win2000 compliant.

Highlights:

Accounting using page-count of the physical printer

Export of data from SafeCom accounting database

Requires a professional accounting program, capable of viewing the exported data Supports Print-and-Pay by exporting data from the "SafeCom Accounting" database. The solution requires a professional accounting program, capable of viewing the exported data and charging accordingly.

Supports Pay-and-Print via external dll loaded by "SafeCom Accounting". This solution also requires a professional accounting program, which implements the dll. The dll is used to retrieve credit information continuously from the accounting program. The accounting program must be capable of monitoring the credit rating of the customers as well as charging them accordingly.

Secure client for Win95 and Win98

National language support for text shown on the LCD display of the FE

Easy administration workload by importing users from Windows user database.

Windows 2000 compatibility.

Simple data mining in Admin GUI.

Pay and Print Demo GUI.

Software Description

In order to implement the accounting system, a new accounting server has been developed in the SafeCom system. This is to manage a database which hold all the information needed for accounting. Thus the CU should be capable of reporting the number of pages printed on the physical printer to the accounting server via the SafeCom Server. Reference printers used during development will be HP 8100 and HP 4500 Color.

The two ways of which the accounting mechanism works is "Print and Pay" and "Pay and Print":

Print and Pay

In this way, all information for accounting is maintained by the accounting server and stored in an accounting database. This is for the administrator to extract information and export it to a file, which will be the interface to an extern accounting application (not included in the SafeCom system). The exported data will be a comma separated file.

The following information is stored in the SafeCom accounting database:

| | |
|---|---|
| key: | ID |
| when: | Start time, End time |
| who: | User name, User login, Email |
| where: | Printer name, Printer Mac, Printer IP, Printer location |
| what: | Job name, Job attr (duplex, color, pages, format, copies), NumberOfCopies |
| status: | Open\|Closed\|Fixed, Total pages. |

From the AdmGUI it will be possible to delete old entries which is not needed anymore.

Pay and Print

The "Pay and Print" functionality is dependant on an external application, capable of keeping track of resource cost of each printer, as well as providing the current credit level of all users. This application is not a part of the SafeCom system, but should include a special component (dll) with the following entry point functions:

StartAccounting(UserInfo, DocumentInfo, PrinterInfo, Copies)→SessionID, OK|Abort, CreditsLeft NotifyPagesPrinted(SessionID, PageCount)→OK|Abort, CreditsLeft StopAccountng(SessionID)

SafeCom will call the above functions to obtain credit information. If ever a function return the "Abort" signal, the client will stop printing immediately.

However, SafeCom will still maintain it's own accounting database with information as in "Print and Pay".

Demo Application for Pay and Print

Although the external application for Pay and Print is not included in this project, a very small program is made for demonstration only.

National Language Support

As mentioned in the requirement specification the national language support is for text shown on the LCD display only.

The supported languages will be English, Danish, German, French, Spanish and Italian. This means that the LCD display must be capable showing special national characters. A special code page is made for this purpose.

UNICODE is implemented in the server software, and a conversion therefore takes places before showing document titles on the LCD display. The conversion will take place in the Server Code.

Windows 2000 Compatibility

The installation program has to be changed for the SafeCom system to run on the windows 2000 platform. If other components needs to be coded specialy for win2000 will be tried out during development.

Module Description

Overview

Figure 4:
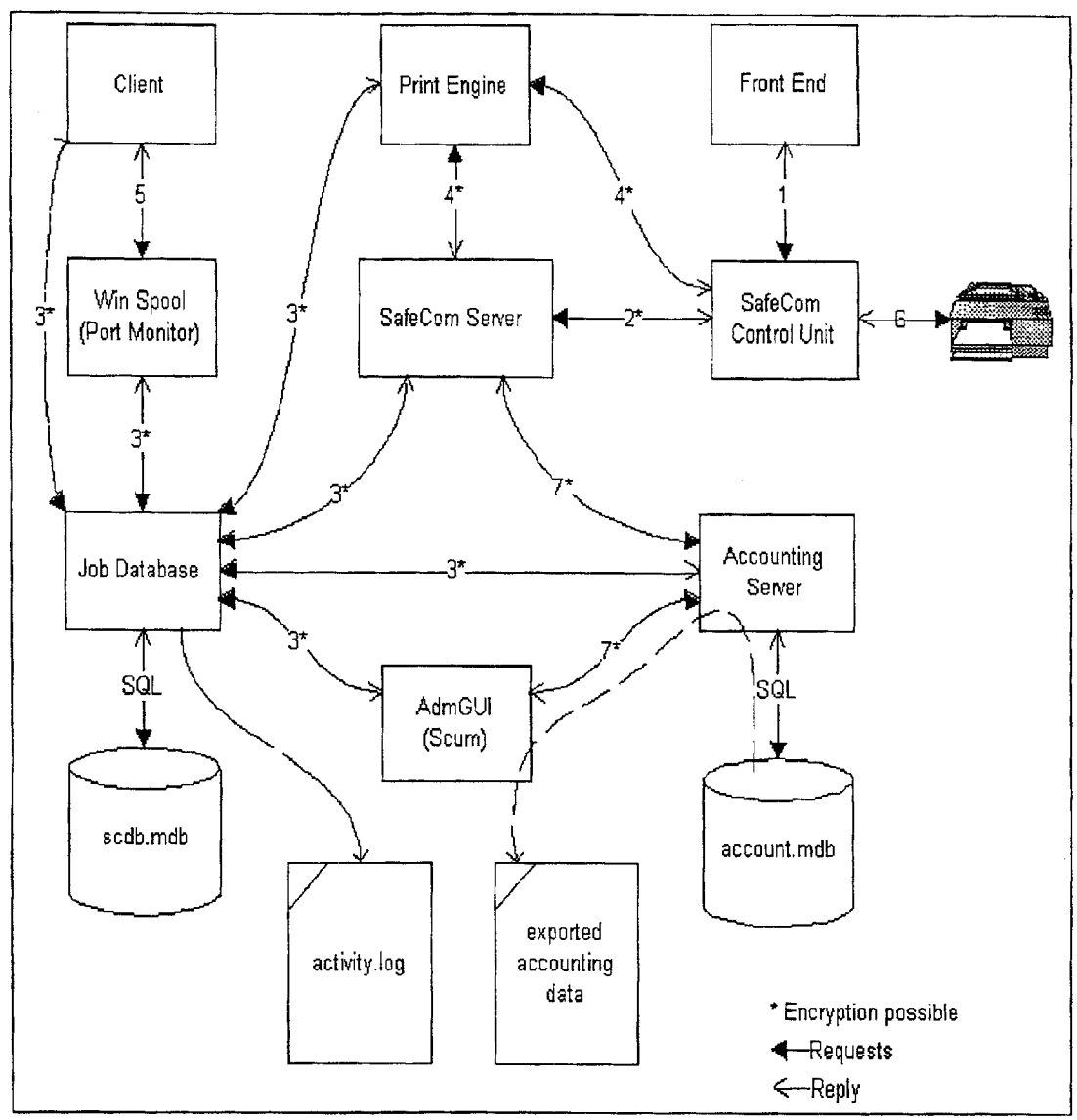
FIG. 4 shows a schematic diagram of all modules (excl. a Broadcast server).

In the following we will show a schematic draw (shown in FIG. 4) of all modules (excl. the Broadcast server) belonging to the SafeCom architecture including the Accounting server. Additionally the FIG. 4 will identify the different interfaces, binding the modules together.

All interfaces are shown as two sided arrows, one filled and one unfilled. The filled arrow indicates which end acts as the server end, thus indicating the direction of all requests belonging to the protocol. Interfaces marked with "*" include encryption facilities applied to the transport layer.

Changes for Accounting Project

This chapter describes the new accounting server modul and the changes in the existing SafeCom modules, if any.

SafeCom Control Unit

It is the Control Unit which start and stop the accounting process and report pages printed while the process is running.

The Control Unit should therefore be capable of detecting page boundaries while printing.

Also the Control Unit's code page is enhanced for national language support.

Front End

TBD (Accounting Messages)

SafeCom Server

The SafeCom Server is modified to hold connection with the new Accounting Server. This is to manage the accounting data from the Control Unit. It is designed to handle continuous information from the Control Unit while printing.

Job Database

The Job Database is enlarged with a printer table holding information about printers and there status. This will give the opportunity to implement "full job control" in the future.

Moreover, this version of the Job Database will create and maintain an activity log file, holding information about user creation, login fail, ect.

Print Engine

No changes.

AdmGUI (Scum)

These new features are discovered:

Make the Accounting Server export the accounting information.

Delete old entries from the accounting database.

Import of the Windows user database.

Simple data mining:
1. Create an overview of how many pages each user has printed during a given time period.
2. Create an overview of the total numbers of pages printed on the various printers.

Note: The AdmGUI is acting through the Scum module, however the data mining must take place locally in the AdmGUI.

Windows Spool (Port Monitor)

It will now be possible to install a secure client on Win95 and Win98 in order to encrypt document data while being transmitted to the SafeCom Server. The Port Monitor is changed for this purpose.

Install Program

The install program will upgrade old databases to the new version introducing new tables.

If InstallShield can create an install program which works on all platforms, only one install program is needed. Otherwise two install programs will be created. One for Win9x and Win NT 4.0, and one Win 2000.

Accounting Server

The Accounting Server manage all the input and output from the database, which hold the information needed for accounting.

It will be a Win32 based process, not necessary running on the same machine as the SafeCom Server. By request and replies, and through the TCP/IP protocol, it will communicate with the SafeCom Server and the Job Database in order to update the accounting database. Also it will be responsible to extract information from the accounting database and export it to a file.

Interface Description

Requests and Replies

This section describes all interfaces with respect to which requests and replies they consist of.

Interface 1—SCFE Protocol

The purpose of the "SafeCom Front End" protocol is to make it possible for the control unit to send and receive information from/to the front end. This includes notifications about key pad events and card reader events as well as methods used to control of the LCD display.

Interface 2—SafeCom Server

The SafeCom server interface provides methods for login, and enumeration of owned documents in the database. Also the interface holds requests and replies used for identification purposes: One request/reply pair is used to identify the SafeCom server and another pair is used to identify the printer attached to the front-end unit. With "SafeCom Accounting" interfaces for accounting is added.

Note: The SafeCom Server is kind of a control channel.

Interface 3—Job Database

The job database interface provides methods for log in, enumeration of owned documents, user administration and identification . With "SafeCom Accounting" interfaces for accounitng is added.

Interface 4—Print Engine

The print engine interface provides methods for login, enumeration, and retrieval of owned documents. While retrieving data, the client can send a request that cancels the upload action.

Note: Print channel.

Interface 5—Native Windows

The SafeCom system does not modify the client machine submitting documents in any way. Normally the windows spooler uses a proprietary format transferred using NetBeui. It is however possible to use other protocols such as the TCP/IP based LPR/LPD protocol.

A detailed description of this interface is therefore not needed in this document.

Interface 6—Native Printer

When the SafeCom control unit sends data to the printer, it will be done using a parallel cable. Formally the transport protocol is called "Centronics". The data transferred is not formatted in any manner, it is just RAW data. An specification of PIN assignments and their use will not be supplied here.

Interface 7—Accounting Server

The Accounting Server interface provides methods for login, starting and stopping the accounting process, and to recieve printing information continuously from the Control Unit via the SafeCom Server.

Broadcast Server

The Broadcast Server is used to identify which Safecom components are running on the network. It also holds methods to configure the SafeCom components.

EXAMPLES

Example

Printing a Document

Figure 5:
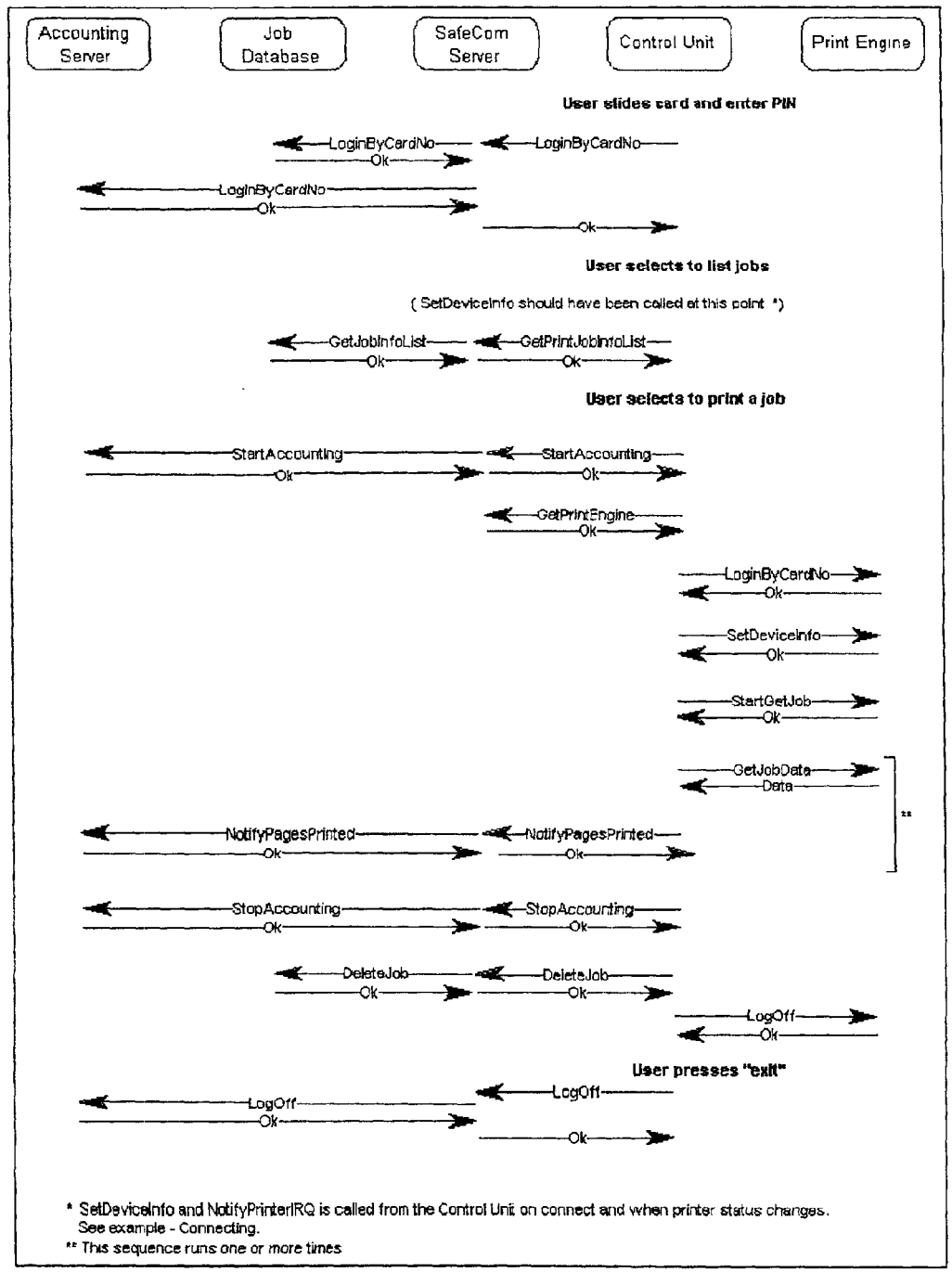
FIG. 5 shows a schematic diagram of signaling in situation where a user prints one document, using "print and pay".

User prints one document, using "print and pay", and leaves, as shown in FIG. 5.

Example

Connecting

Figure 6:
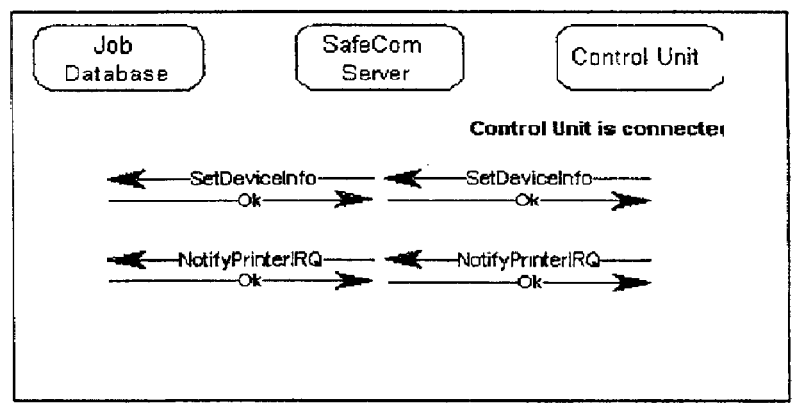
FIG. 6 shows a schematic diagram of signaling of the printing control system.

FIG. 6 shows how SetDeviceInfo and NotifyPrinterIRQ are used.

Requirement Specification

General

| Abbreviations | |
|---|---|
| SS | SafeCom Server |
| PE | Print Engine |
| JDB | Job Database |
| CU | Control Unit |
| FE | Front End |
| AS | Accounting Server |
| AdmGui | SafeCom Administration Tool |

Brief Product Description

This document describes the requirements to the project "SafeCom Accounting". The project is based on the product described as "SafeCom". Except if explicitly noted herein, all functionality and behavior implemented in "SafeCom" applies to "SafeCom Accounting".

The different components of "SafeCom Accounting" will run on the following platforms.

| | WinNT 4.0 at Service Pack 4+ | Win95 | Win98 | Win2000 |
|---|---|---|---|---|
| Server Software | X | — | — | X |
| AdmGui | X | X | X | X |
| Secure Client with billing dialog and Distribution dialog. | X | X | X | X |

Highlights

Accounting using page-count of the physical printer. Reference printers used during development will be HP 8100, HP 4500 Color and Lexmark 2455/3455

Page count will be implemented both in hardware and in software. The hardware will obtain page count information by issuing PJL commands at the beginning and the end of each printed job. Postscript capable printers will be queried for page-count information, by embedding a postscript application capable of reporting back to the control unit. The software will obtain page count information by scanning the submitted data. The software will be capable of understanding the following data streams: PCL, PS, PCL-XL. Naturally the accounting-server will log how the page-count was obtained. Typically hardware page-count will be weighted above software page-count. The control unit decides which page count is to be used for each individual job.

Supports Print-and-Pay by exporting data from the "SafeCom Accounting" database. The solution requires a professional accounting program, capable of viewing the exported data and charging accordingly.

Secure client for Win98 and Win95

The software can install and run under Windows 2000. There will be no support for remote client installations, MMC management etc. The software can simply be installed using the same install program as for WinNT 4.0.

Simple data mining in Admin GUI

Billing dialog shown on client machine at print submission time.

Distribution dialog shown on client machine at print submission time. The distribution dialog will enable a user to 'mail' a document to other people. As added feature the submitter can specify a interval in time where the document will exist (document lifetime). This can be used to make a document appear at a specified time and to ensure that the document expires (is deleted) at some other point in time.

Software Description

The main ambition of the "SafeCom Accounting" project is to improve "SafeCom" with tracking capabilities. Tracking requires that the CU is capable of counting the actual number of pages printed on the physical-printing device. Subsequently, the CU must report pages printed to the SafeCom Server, so the person printing the document, can be charged accordingly.

The tracking mechanism implemented is this version of SafeCom Accounting is also known as "Print and Pay".

Print and Pay

Users using the "Print and Pay" mechanism, will be charged at some time after the actual printing is performed. "SafeCom Accounting" merely keeps track of how many pages the user is printing. This information can be exported to a file and imported into a professional accounting system capable of creating invoices. Since an invoice typically needs some degree of detail information, we have chosen to log almost everything we know about each printed job (se description of the "accounting table" below)

Since this is not a design document, we will ignore details about how the page information is handled by the server software. The end result will however be, that the server software maintains a table in its database with entries for all printed jobs. Each entry holds information about:

Who printed the job

Where the document was printed (on which printer)

Printer classification tag (used to categorize printers in different pricing groups)

When it was printed

Properties of the job itself (duplex, pages, copies, etc.)

Job Status (Job is being printed, Job successfully printed, Job aborted during printing)

Billing info (A configurable string chosen by the client at submission time).

The entries in the accounting table are never automatically deleted from the database. It will be possible through the AdmGui to delete old entries from the accounting table. The deleted entries will be serialized to disc before deletion. This makes it possible to query the database for historical information.

Billing Mechanism

Customers have requested a mechanism, where the client is forced to tag each print job with one of several configurable categories. The AdmGui must be able to configure different categories for each user. This will enable the customers to keep track of which category a printed document is printed in combination with, which is a feature that enables the customers to keep track of for example a projects use of paper.

The secure client, who is in charge of displaying the dialog, will need to retrieve all categories available to the user, before displaying the billing dialog.

It must be configurable whether the billing dialog is to be displayed or not. The most flexible approach is to control this from the AdmGui, and let the information flow to the secure client when it tries to retrieve a users-list of categories.

Creation and assignment of categories are performed centrally using the AdmGui The billing system will use the users network login as user authentication scheme.

Print Distribution Mechanism

Customers have requested a mechanism than enables a client to distribute the same document to more than one user. This is achieved by displaying a window at print submission time, where the document author can select between different distribution groups (mailing lists). After selection the document will be sent to all individuals of the selected group.

To avoid flooding of the job database, the document data itself, will be kept in one incarnation only. Each user receiving the document will in reality only own a "reference" to the document, which can be deleted without any impact on the other users. Only when the last user referring the job, has deleted the job reference, will the physical document data be removed from the harddisk.

Conceptually a job always has one job author (being the user that submitted the job) and several job owners. The owners can print the job and chose to delete or retain their reference. Deletion of references simply means just that. A job will be deleted from the system only if all references have been deleted.

Configuration of distribution groups is done using the AdmGui. Also, the AdmGui makes it possible to assign the various distribution groups to different users. When a user is distributing jobs, she will be allowed only to distribute to those groups that have been assigned to her.

When a user summits a document she can specify an interval in time, where the document exists. This interval defines the lifetime of the document. A document will appear in its owner's queue, as soon as the current date-time lies within the document lifetime interval. When the document expires in lifetime it will be deleted from the system.

Transmission Performance Optimization

All server components in "SafeCom Accounting" uses the "SafeCom Secure TCP/IP" protocol for communication—even if they reside on the same machine. This is not optimal, since there is no need to encrypt data between inter-process boundaries. Also, the TCP protocol itself is very slow compared to dedicated inter process communication algorithms. SafeCom Accounting will use an improved version of the "SafeCom Secure TCP/IP" communication protocol, which use secure TCP/IP between processes on different machines and fast inter-process communication between processes on the same machine.

Configuration

Upgrade Old Databases to New Versions Directly From Installer

New versions of SafeCom introduce new tables in the database. It is required that the installation program is capable of upgrading an existing database to the new format.

Administration

Just like SafeCom the "SafeCom Accounting" project will be administered using the AdmGui. New functionality is the ability to:

Export data from the accounting table to a file that can be interpreted by other products.

Perform simple data mining in the collected data.

Define new billing categories and assign them to users.

The AdmGui will enable the user to specify an email mask used when creating new users. The idea is that if the administrator enters the email mask "@i-data.com" then all new users will be assigned the email address "user Id@i-data.com" automatically.

Export Functionality

It will be possible to export data from the accounting table to a file that can be interpreted by other products. To maximize integration ease we will use a data format that is immediately readable by most database tools (ODBC file, comma-separated file, or similar.) The exported data will initially be exported to a comma-separated file. If time permits it we will implement other export formats.

Along with the exported data, will be a so-called schema file. The schema file documents all exported fields with respect to their individual name and data type. The format of the schema file will be the format demanded by the Delphi TTable component. This will ensure, that the Admin GUI can immediately import the exported data (no need for writing a scanner, parser etc.).

The electronic manual will have a section that describes the format of the exported data. The section will include an example that describes how to import the exported data into Microsoft Excel or Microsoft Access.

Simple Data Mining

"SafeCom Accounting" always maintains the accounting table. It is therefore possible to use the AdmGui to perform simple data mining in the collected data. The AdmGui will display the following statistical information.

1. An overview of how many pages each user has printed during a given time period
2. An overview of the total number of pages printed on the various printers
3. An overview of how many print jobs that is accounted to each defined category. The overview must include the total amount of printed pages for the given category.

As in all window programs it will be possible to print the graphs to the Microsoft spooling system.

Billing Categories

When submitting print to "SafeCom Accounting", the client will be presented with a dialog prompting for a category assignment. The categories shown are only those categories that have been assigned to the user. Creation and assignment of categories are performed in the AdmGui.

Distribution Groups

It will be possible to create new distribution groups and assign them to users. The users of the system can distribute to those groups that have been assigned to them. It is also possible to enable/disable distribution for each user. This has no impact on the lists assigned to the users. If distribution is disabled, the distribution dialog will simply not be shown to the user at print submission time.

Hardware and Software Environments

Secure Clients for Win9x

The port monitor will be ported to Win9x, to enable secure submission of document data. In order to make a client machine SafeCom capable, it will be necessary to install the software from the CD-ROM.

Windows 2000

All components in SafeCom Accounting will be Win2000 compliant. This does not imply that SafeCom is ready for Win2000 certification. The software can be installed using the NT4.0 installer and it can be configured and executed exactly like on an NT 4.0 system. Missing for full Win2000 integration is MMC management (Microsoft Management Console), Remote client installation, full UNICODE support (NLS) etc. .

Backward Compatibility

The new server software will be able to service old clients (GA version). This includes old control units as well as old secure clients. Jobs printed from front-ends running old GA-firmware will not be able to report hardware page-count information back to the servers. Instead the servers will use the calculated software page-count information for jobs printed on the old devices.

It is of course highly recommended that the users quickly port their installation to the new software level. However, since this can take several days -it is essential that the system also functions during the transition period.

Since some of the control units will be updated with new firmware, it is important that the control units function on both old and new servers.

SafeCom Unit Description

The SafeCom Unit consists of a "Front End" as well as a "Control Unit".

The front end is equipped with a touch sensible LCD display, and a magnetic card reader. Basically the Front End functions as the users terminal at the printer. From a hardware point of view, the Front End used in the "SafeCom Accounting" project is identical to the one used in the "SafeCom" project.

The control unit used could theoretically be any i-data print server that is equipped with a RS-232 interface. The "SafeCom Accounting" project in its first version will use the "EasyCom Xpress" unit as print server.

During the months following the release of SafeCom, we have received requests from customers asking for various small changes, which would make the system user-friendlier. The following list enumerates those changes that will be implemented as a direct consequence of the requests.

During installation the user is sometimes required to edit a list of IP broadcast masks. This is difficult to do, since practically all our users have no clue as to what a broadcast mask is. As solution the "Front End" will show a hint stating that the user can enter the IP address of the "SafeCom Server" instead.

The "retain" option does not function as expected, as the documents lose their "retained" state, after the user exists her session on the "Front End". Also, when displaying the list of jobs, it would be nice to be able to see which documents are retained and which are not.

When discovering the various SafeCom servers, multiple server entries appear for the same installation. This is confusing and will be avoided by changing the identify mechanism implemented in the servers.

Hardware Description

No hardware changes are necessary.

Mechanical Description

N/A

Electronic Description

N/A

Configuration

N/A

Quality Consideration

N/A

Specifications

N/A

Test Specification

Reporting

The following reports are required:

BPT report

DVT-A Report

DVT-B Report

Reporting will be done using incident reports

Pass/Fail Criteria

The pass criteria for DVT:

No severity 1 or 2 incidents with status Open, verified

Less than 10 severity 3 incidents with status Open, verified.

Test Area

The DVT test will focus on the following areas:

Test of the SafeCom SW on the NT Server

Installation

Usage of GUI

Security

Stress

Test of the SafeCom Control Unit

Installation,

Boot plus micro code upgrade

Configuration,

Multiple SafeCom Control Units

Error recovery

Test of the SafeCom Front End Unit

Usage

Micro code upgrade

Error recovery

Test of Usability of SafeCom System

Performance of SafeCom system

Test of the reliability of the page detection algorithm

Test Environments

The test will be done in the environments listed underneath:

| | |
|---|---|
| NT 4.0 Server | Server code, Port Monitor, AdmGui |
| Win95 | Port Monitor, AdmGui |
| Win98 | Port Monitor, AdmGui |
| Win2000 | AdmGui |

Various Microsoft NT file systems will be used

NTFS

FAT

Various Printers e.g. HP 8100, HP 4500 Color and Lexmark 2455/3455

Safecom Accounting

General

Intent

All users currently running SafeCom could (and should) upgrade their SafeCom version. The reason is that we have made significant improvements in overall system performance as well as to the auto configuration mechanisms used.

It is possible to create two versions of the new SafeCom version—one with and one without accounting support. There are currently no plans of doing this; instead we plan for one release featuring all new functionality.

Availability

SafeCom Accounting is made available for sales late Q1 year 2000. The project itself is estimated to exit DVT 18/02-2000. This means that the GA date will be approximately a month from this date. This depends on the length of the alpha and beta test periods as well as the time it takes to produce the final CD-ROM.

Compatibility

During installation the product will check for an older version, and if located it will upgrade the old version in such a way that no data is lost. This applies to the old configuration data as well as to the old job data and user data.

The product will be able to work with print servers running old SafeCom firmware. In this case the hardware page-count normally propagated back to the servers will be unavailable, and a software page-count generated at submission time will be used.

Headlines

Distribution (enabling users to distribute jobs to one or more users at print submission time)

Billing (forcing users to tag documents at print submission time)

Tracking (tracking documents as they are printed—pages, printer, user, time, date, billing info)

Abstract

SafeCom Accounting is a new version of SafeCom that supersedes the old SafeCom versions. The version enables the user to track resource usage, and to export the tracking data to a comma-separated file. The format of the exported material is readable by spreadsheet programs like Microsoft Excel. The configuration program used to configure SafeCom (the AdmGui), has been enhanced with functionality, that enables the user to perform data mining on the exported material.

The different views are:

Total print usage for each user

Total print usage for each printer

Total print usage for each billing category

Billing is a mechanism that enables the user to tag a print job at submission time. The tag will follow the document until it is deleted. Each time a user prints the document, the tracking system will log information about the document, the user, the time of day and among other things the billing tag. The data-mining module therefor has all needed information available for generating summaries over the total print usage for each billing category.

New is also a mechanism enabling a user, to submit a printed document to other users of the system. The mechanism is called 'distribution' and it allows the Administrator to configure various distribution lists, and assign these to users of the system. When a user submits a document she will be presented with a dialog prompting for information about who is to receive the document.

Details

Accounting/Tracking

As the name "SafeCom Accounting" implies, we have weighted accounting abilities really high, when we defined this new version. The ambition was to create a mechanism that would enable SafeCom to continually keep track of page use. Once you start implementing this, you realize that the task is more complicated than you would think. The problem lies in establishing a reliable means of obtaining a page-count information.

The solution to the problem is twofold.

1. When data is submitted to the SafeCom database, the submitting application (the port monitor) analyses the data-stream, and generates an estimate as to the number of pages in the job. This page-count (called the software page-count) is passed along with the job and placed in the database. The data-streams, recognized by the port monitor, are PCL, PCL-XL and PostScript.

2. When data is printed, the SafeCom hardware (the control unit) will use various methods to retrieve a page count from the physical printer. There are several techniques used, although the most important is to have the control unit issue PJL commands before and after each job. Since not all printers support PJL, we are working on an alternative mechanism, where a PostScript program is submitted to the printer, and made responsible for reporting page count information back to the control unit.

SafeCom Accounting tracks down a broad range of information. The idea is to collect as much relevant information as possible, and use the information later on, when we need it for data-mining purposes. We only store static information, and purposely leave out policy dependant things like the price of a job. As a rule of thumb, one can say that we store information that can be measured in exact units and leave out information that can be deducted from the stored information. This approach gives us a tremendous advantage, when it comes to implementing new accounting strategies, new graphs, etc.

The information stored is as follows:

| | |
|---|---|
| Base information | Date, StartTime, EndTime, Copies, TotalPages-HW/SW, State (Job_Started, Job_Completed, Job_Interupted) |
| User information | UserName, Email |
| Printer/Print server information | MAC, PrinterName, IP-Addr, Location, DeviceModel, ColorSupported |
| Job information | Job name, JobIsDuplex, JobIsColor, DeviceDriverUsed |
| Billing information | Client Name, Account |

Billing Mechanism

In some organizations it is desirable to enable or force the users to categorize jobs at submission time. Such information can be used afterwards to calculate prices or to analyze the collected data. As an example the billing functionality could be used to force each submitting user to select which "project" a print job should belong to. The user would be shown a dialog when trying to print, and prompted to select one of the listed of project numbers, before the document was printed.

The AdminiGui of SafeCom Accounting will enable the administrator to create new billing categories and assign them to one of more users. A billing category is an ordered pair of respectfully a Client Name and an account. An examplary configuration could be as follows:

| Client | Account | Assigned users |
|---|---|---|
| Microsoft | 3443 324252 | Brian, Mark |
| Microsoft | 5675 324253 | Brian |
| Microsoft | 3453 899976 | Brian |
| i-data Printing Systems | 102.304/11 | Mark |
| i-data Printing Systems | 102.304/12 | Brian, Mark |
| i-data Printing Systems | 102.272/11 | Joe, Brian, Mark |

Distribution Mechanism

The distribution mechanism enables a user to submit a print job to a group of users. Since this means placing documents in other peoples private queues, it is possible to configure which users have this privilege.

The Administrator of SafeCom can use the AdmGui to define distribution lists (each containing one or more users). After this is done, the Administrator can assign users the right to distribute jobs to these lists. This means that it isn't possible for the user, to create a new distribution list at submission time. Only the pre-defined lists can be chosen from.

When submitting a document to others, it really means submitting a reference to a document to a user. The physical data represented is thus not copied again and again since this would flood the hard disk of the server machine. SafeCom keeps track of when to delete the physical data, naturally as long as someone references the job, the physical data stays on the hard disk.

General Issues

SafeCom Accounting uses an improved version of the SafeCom communications protocol. The structures, passed around by the protocol, have basically been strengthened with new fields, including fields meant for future expansion purposes. This means that we can create new SafeCom releases without significantly changing the protocol, which is a major advantage.

We have made major changes to the discovery method used by the various system components when they need to locate each other. As before we use an UDP network frame, to request responses from the other components. The change lies in the responses, where we among other things send back a list of all TCP/IP addresses assigned to the component. Earlier we just sent back the network address that the request was received on. The advantage is, that all replies from a component will be identical (they all send back the same list). A client receiving the response can thus iterate through the list until it locates an entry that it has a route to. This may seem like an insignificant change, but it actually means, that the discovery mechanism is many times more reliable than before.

The one reason why the first release of SafeCom was rather slow was, that we used TCP/IP as a means of inter-process communication (communication between components running on the same server machine). TCP/IP is really annoying when it is used locally, as it spends most of the CPU time, waiting for an event that never occurs. The reason why it does this is a bit complicated, but can shortly be explained as follows: When a packet is to be transmitted it is split up in smaller chunks. Each of these is sent to the receiver in separate network frames. Since the last frame is usually only partially used, it makes sense to examine if there is more data that is to be sent. When used locally, the TCP/IP protocol waits for about 200 ms for this to happen, until it finally times out and sends the frame. In SafeCom there never is any extra data to send, which means that the TCP/IP protocol wasted 200 ms each time it needed to send data from one point to another. To circumvent this, we use new communications protocol for local connections. The protocol is called "LocalPipe" and it performs really well. The performance gain from this change has been measured in average to about 10 times faster than before.

Software Design Specification for "Interfaces"

General

This part describes the interfaces that are offered by the SafeCom system inclusive accounting. The following interfaces are described:

JobDatabase interface
PrintEngine interface
SafeCom Server interface
BroadcastServer interface
Accounting Server interface Each interface is described by command, followed by arguments, and the replies to the command. Finally the security level for the command. The security level is divided into three levels. Lowest is User, second is PowerUser and above all is the Administrator. When a security level is denoted it means that level and above.

The first part gives a description of definitions. After this section is given an overview of the five interfaces described in this document. Then the common requests and replies among the interfaces are described. Finally the server specific requests and replies are described.

Interface History

All transaction-elements have a version field, used to identify which interface version the request or reply belongs to. The following table summarizes existing interface versions.

| Interface version | Product Name | Project Number | S-number |
|---|---|---|---|
| 1 | SafeCom | 102.304/11 | 070.010 |
| 2 | SafeCom Accounting | 102.304/11 | 070.030*nn |

Type Definition
StructType
The element type can be:

| Name | Value | Comment |
|---|---|---|
| stFaktura | 1 | |
| stUser | 2 | |

DeviceInfoStruct2

| Length | Field | Comment |
|---|---|---|
| 4 | m__nStructLength | Length of struct |
| 2 | m__nVersion | Version Number (set to 2) |
| 2 | m__nSubVersion | Version of achReserved (set to 0) |
| 6 | m__achDeviceMAC[1] | 6 byte MAC address of device |
| 4 | m__nDeviceIpAddr | 4 byte IP Address of device |
| 2 | m__nDeviceStatus | Ready(0), InterventionRequried(1) |
| 4 | m__achDeviceStatus-Description | Bitfield (See below) |
| 2 | m__nDuplex | Does device support Duplex? Yes(1), No(0) |
| 2 | m__nColor | Does device support Color? Yes(1), No(0) |
| 8 | m__fPricePrPage | Price pr page printed |
| 4 | m__nSupportedPaper-Types | A4 (1), A3 (2), LETTER (4), TBD (>2^2) |
| 2 | m__nNumberOfFormats | Number of elements in Format list |
| 32 | m__achReserved | Reserved for protocol extensions (zero padded) |
| + | m__szDeviceName | Name of Device. Must be unique for devices on same MAC |
| + | m__szLocation | Free format string defining location of device |
| + | {Format2}* | wrapped by m__achData |

DeviceStatusDescription

| Placement in array | Status - Yes(1), No(0) |
|---|---|
| Byte 0–Bit 7 | Printing |
| Byte 0–Bit 6 | MemoryShortage |
| Byte 0–Bit 5 | PaperOut |
| Byte 0–Bit 4 | PaperJam |
| Byte 0–Bit 3 | TonerOut |
| Byte 0–Bit 2 | DeviceOffline |
| Byte 0–Bit 1 | 0 |
| Byte 0–Bit 0 | 0 |
| Byte 1–Byte 3 | 0 |

[1]A printer uniquely identified by its MAC and DeviceName

| Length | Field | Comment |
|---|---|---|
| | | Format2 for source and target |
| 4 | m__nStructLength | Length of the struct including this field |
| 2 | m__nVersion | Version Number (set to 2) |
| 2 | m__nSubVersion | Version of achReserved (set to 0) |
| 4 | IformatType | PCL4 (1), PCL5 (2), IPDS (3), PS (4), ICDS (5), SPECIAL (6) |
| 8 | m__achReserved | Reserved for protocol extensions (zero padded) |
| + | SzSpecialFormat | Describes the format if iFormat=SPECIAL |
| | | FakturaInfoStructV2 |
| 4 | m__nStructLength | Length of the struct including this field |
| 2 | m__nVersion | Version Number (set to 2) |
| 2 | m__nSubVersion | Version of achReserved (set to 0) |
| 2 | m__nStructType | stFaktura |
| 4 | m__nBillingId | Unique id of this billing entry |
| 4 | m__nBillingNid | Unique node id of this billing entry |
| 2 | m__nIsGroup | |
| 32 | m__achReserved | Reserved for protocol extensions (zero padded) |
| + | szClient | Description |
| + | szAccount | Name |
| | | IdentifyStruct2 |
| 4 | m__nStructLength | Length of the struct including this field |
| 2 | m__iVersion | Version Number (set to 2) |
| 2 | m__nSubVersion | Version of achReserved (set to 0) |
| 2 | m__nIpPort | |
| 4 | m__nType | Bitfield defining server type 0x01: Print Engine 0x02: SafeCom Server 0x04: Port Monitor 0x08: Job Database 0x10: Accounting Server |
| 8 | m__ach Reserved | Reserved for protocol extensions (zero padded) |
| | | JobInfoStruct2 |
| 4 | m__nStructLength | Length of the struct including this field |
| 2 | m__nVersion | Version Number (set to 2) |
| 2 | m__nSubVersion | Version of achReserved (set to 0) |
| 4 | m__nJobId | Unique id identifying the job |
| 4 | m__nBillingId | Unique id for entry in billing table |
| 4 | m__nGroupNid | |
| 4 | m__nSize | Size of document |
| 4 | m__nPages | Pages in document |
| 2 | m__nDuplex | YES(1), NO(0) |
| 2 | m__nColor | YES(1), NO(0) |
| 21 | m__szOwner | UserLogon of job owner (zero terminated). Owning a job means having the job in ones print queue) |
| 21 | m__szAuthor | UserLogon of job author (zero terminated). The author is the user that submitted the job into the job database. |

-continued

| Length | Field | Comment |
|---|---|---|
| 8 | m_achDate | Submission date of entry in the job database (dd-mm-yyyy) |
| 6 | m_achTime | Submission time of entry in the job database (hh-mm-ss) |
| 8 | m_achLifeStartDate | The job is accessible by it's owners from this date-time and forward. (dd-mm-yyyy) |
| 6 | m_achLifeStartTime | (hh-mm-ss) |
| 8 | m_achLifeStopDate | The job is accessible by it's owners until this date-time is reached. The job is then deleted. (dd-mm-yyyy) |
| 6 | m_achLifeStopTime | (hh-mm-ss) |
| 2 | m_nDestroyAfterFirstDelete | |
| 4 | m_nAccountingTag | Reserved for later use |
| 2 | m_bRetained | Retained(0), Not retained(1) |
| 32 | m_achReserved | Reserved for protocol extensions (zero padded) |
| + | Format2 | Document Format |
| + | szJobName | Title of document |
| + | szPageFormat | Page Format as String |

PrintJobInfoStruct2

| Length | Field | Comment |
|---|---|---|
| 4 | m_nStructLength | Length of the struct including this field |
| 2 | m_nVersion | Version Number (set to 2) |
| 2 | m_nSubVersion | Version of achReserved (set to 0) |
| 4 | m_nJobId | Unique id identifying the job |
| 4 | m_nBillingId | Unique id for entry in billing table |
| 4 | m_nGroupNid | |
| 1 | m_uchPrintable | YES(1), NO(0) |
| 4 | m_nDocumentSize | Size of document in bytes |
| 4 | m_nPages | Pages in document |
| 2 | m_nDuplex | YES(1), NO(0) |
| 2 | m_nColor | YES(1), NO(0) |
| 8 | m_achDate | The date of entry in the job database (dd-mm-yyyy) |
| 6 | m_achTime | The time of entry in the job database (hh-mm-ss) |
| 8 | m_achLifeStartDate | The job is accessible by it's owners from this date-time and forward. (dd-mm-yyyy) |
| 6 | m_achLifeStartTime | (hh-mm-ss) |
| 8 | m_achLifeStopDate | The job is accessible by it's owners until this date-time is reached. The job is then deleted. (dd-mm-yyyy) |
| 6 | m_achLifeStopTime | (hh-mm-ss) |
| 21 | m_szOwner | The user logon name that submitted the job |
| 21 | m_szAuthor | UserLogon of job author (zero terminated). The author is the user that submitted the job into the job database. |
| 2 | m_nDestroyAfterFirstDelete | |
| 4 | m_nAccountingTag | Reserved for later use |
| 2 | m_bRetained | Retained(0), Not retained(1) |
| 2 | m_nNumberOfTargetFormats | Number of Target Formats in list below |
| 32 | m_achReserved | Reserved for protocol extensions (zero padded) |
| + | Format2 | Source Format |
| + | {Format2}* | List of possible target formats |
| + | szJobName | Job Title |
| + | szPageFormat | Page Format as String |

UserInfoStruct2

| Length | Field | Comment |
|---|---|---|
| 4 | m_nStructLength | Length of the struct including this field |
| 2 | m_nVersion | Version Number (set to 2) |
| 2 | m_nSubVersion | Version of achReserved (set to 0) |
| 2 | m_nStructType | stUser |
| 4 | m_nUserId | Unique id identifying the user |
| 4 | m_nUserNid | Unique node Id of user |
| 2 | m_nIsGroup | YES(1) | NO(0) |
| 2 | m_nGroupEnabled | |
| 21 | m_szUserLogon | Asc-ii string identifying the user |
| 17 | m_szPassword | Asc-ii string password |
| 40 | m_szCardNo | Card number |
| 5 | m_szPINCode | PIN code - zero terminated |
| 9 | m_szPUKCode | PUK code - zero terminated |
| 2 | m_nLogonFails | Number of failed logins |
| 2 | m_bUserLocked | Unlocked(0), Locked(1) |
| 2 | m_bAvoidPin | Pin Enabled(0), Pin disabled(1) |
| 2 | m_bCardOpen | PIN code assigned(0), Awaiting pin assignment/ Outstanding PUK(1) |
| 8 | m_fAccount | Credits left for the user |
| 2 | m_nBillingModel | None(0), (1)BillingDialog 1 |
| 2 | m_nAccountingModel | None(0), PrintAndPay(1), PayAndPrint(2) |
| 32 | m_achPermissionFlags | An array of chars, each describing actions that a user has permission to perform. The table below shows which actions the individual bytes associate to. |
| 32 | m_achReserved | Reserved for protocol extensions (zero padded) |
| + | szFullName | wrapped by m_achData |
| + | szDescription | wrapped by m_achData |
| + | szEMail | wrapped by m_achData |

Permission Bit-Field Assignment

| Placement in array | Request |
|---|---|
| Byte 0 | canActAsUser |
| Byte 1 | canSubmitJob |
| Byte 2 | canRetrieveJob |
| Byte 3 | canAdministrateUsers |
| Byte 4 | canAdministrateAccounting |
| Byte 5 | canAdministrateBilling |
| Byte 6 | canAccounting |
| Byte 7 | canBilling |
| Byte 8 | canConfig |
| Byte 9 | canAdministrateNids |
| Byte 10 | CanGetUserInfoList |
| Byte 11 | CanChangePinCode |
| Byte 12 | CanDeleteJob |
| Byte 3–31 | Unused (set to 0) |

The following requests can be issued without being logged in and thus requires no permission flags: GetDeviceInfo, SetDeviceInfo, NotifyDeviceIrq, GetPrinters, GetPrintEngine Interfaces—Overview If a server receives data that cannot be recognized as one of the requests below, it will return an UnknownReply with status SC_UNKNOWN_REQUEST. If the server receives a newer version of a known command than it can handle, it will return an UnknownReply with status SC_UNSUPPORTED_VERSION.

| SafeCom Server | | | |
|---|---|---|---|
| SafeCom Server (Common Commands) | Arguments | Reply | Security Level |
| LoginByCardNo | CardNo×PinCode | Status, UserInfoStruct2 | $U^2$ |

SafeCom Server

| SafeCom Server (Common Commands) | Arguments | Reply | Security Level |
|---|---|---|---|
| LoginByUserLogon | UserLogon×Password | Status, UserInfoStruct2 | A,PU |
| Logoff | None | Status | U |
| ChangePINCode | NewPINCode | Status | U |
| DeleteJob | JobId | Status | U |
| SetPrintJobInfo | JobId× PrintJobInfoStruct2 | Status | U |
| OpenCard | CardNo×PUKCode× PINCode | Status | —[3] |
| UpdateFromRegistry | — | — | — |
| GetPrinters | | Status,{szDeviceDriver Names}+ | — |
| GetPrintEngine | SourceFormat× TargetFormat | Status, {PE-IpAddr}, PE-IpPort | — |
| SetDeviceInfo | {DeviceInfoStruct2}+ | Status, SenseCode | — |
| GetDeviceInfo | | Status, SenseCode,{DeviceInfoStruct2}+ | — |
| NotifyDeviceIrq | {Device InfoStruct2}+ | Status, SenseCode | — |
| StartAccounting | JobId × PageCountModel × NumberOfCopies × DeviceInfoStruct2 | Status, SenseCode, SessionID, CreditsLeft | U |
| NotifyPagesPrinted | SessionID × DeltaPageCount | Status, SenseCode, CreditsLeft | U |
| StopAccounting | SessionID | Status, SenseCode | U |

[2]This login request cannot be used to obtain Administrator or Power User privileges. Only LoginByUserLogon will do this. If an Administrator logs in by card number, she will be granted access to the system with user privileges only.
[3]It is always possible to issue this request even if not logged on.

| SafeCom Server (Spec. Commands) | Arguments | Reply | Always Encrypted | Security Level |
|---|---|---|---|---|
| GetPrintJobInfoList | None | NoJobs × {PrintjobInfoStruct2}* | No | U |

Job Database

| Job Database (Common Commands) | Arguments | Reply | Security Level |
|---|---|---|---|
| LoginByCardNo | CardNo×PinCode | Status, UserInfoStruct2 | U[4] |
| LoginByUserLogon | UserLogon×Password | Status, UserInfoStruct2 | A,PU |
| Logoff | None | Status | U |
| ChangePINCode | NewPINCode | Status | U |
| OpenCard | CardNo×PUKCode× PINCode | Status | U |
| StartGetJob | JobId×TargetFormat | FileHandle | U |
| GetJobData | FileHandle × Length | Length × Data | U |
| CancelGetJob | FileHandle | Status | U |
| DeleteJob | JobId | Status | U |
| SetJobInfo | JobId×JobInfoStruct2 | Status | U |
| UpdateFromRegistry | — | — | —[5] |
| GetPrinters | | Status,{szDeviceDriver Names}+ | — |
| SetDeviceInfo | {DeviceInfoStruct2}+ | Status, SenseCode | — |
| GetDeviceInfo | | Status, SenseCode,{DeviceInfoStruct2}+ | — |
| NotifyDeviceIrq | {DeviceInfoStruct2}+ | Status, SenseCode | — |

[4]This login request cannot be used to obtain Administrator or Power User privileges. Only LoginByUserLogon will do this. If an Administrator logs in by card number, she will be granted access to the system with user privileges only.

| Job Database (Spec. Commands) | Arguments | Reply | Security Level |
|---|---|---|---|
| ValidUserByCardNo | CardNo | Status, UserId | PU |
| ValidUserByUserLogon | UserLogon | Status, UserId | PU |
| StartAddJob | JobInfoStruct2 | Status, FileHandle | U |
| StartAddJobByUserId | JobInfoStruct2 × UserId | Status, FileHandle | U |
| AddJobData | FileHandle×Size of×Data | Status | U |
| CommitJob | FileHandle | Status | U |
| CancelAddJob | FileHandle | Status | U |
| GetJobInfoList | None | Status, NoJobs, {JobInfoStruct2}+ | U |
| GetJobInfoListByUserId | UserId | Status, NoJobs, {JobInfo-Struct2}+ | PU |
| GetUserInfo | None | UserInfoStruct2 | U |
| GetUserInfoList | None | NoUsers, {UserInfoStruct2}+ | A |
| GetUserInfoByUserId | UserId | UserInfoStruct2 | A |
| DeleteUser | UserId | Status | A |
| AddUser | UserInfoStruct2 | Status | A |
| ModifyUser | UserInfoStruct2 | Status | A |
| AddPrinter | szDeviceDriverName | Status | PU |
| RemovePrinter | szDeviceDriverName | Status | PU |
| AddFaktura | FakturaInfoStruct2 | Status | A |
| ModifyFaktura | FakturaInfoStruct2 | Status | A |
| RemoveFaktura | FakturaId | Status | A |
| GetFakturas | None | Status× NoFakturas× {FakturaInfoStr2}+ | A |
| GetFakturaById | NID | FakturaInfoStruct2 | U |
| AllowUserToNid | NID×NID | Status | A |
| DenyUserFromNid | NID×NID | Status | A |
| GetUsersAllowedToNid | NID | {NID}+ | A |
| GetGraphByNid | NID | . . . | U |
| LinkNidToNid | NID×NID | Status | A |
| UnLinkNidFromNid | NID×NID | Status | A |

[5]It is always possible to issue this request even if not logged on.

Configuration Parametres:

| | |
|---|---|
| SMTP Server Address | x.x.x.x |
| Warning time | mm-dd-yyyy hh:mm:ss |
| Delete Time | mm-dd-yyyy hh:mm:ss |
| Sanity Check Time | mm-dd-yyyy hh:mm:ss |
| Email Warning | 1 Enabled 0 Disabled |
| MaxNoOfFailes | x > 0 |
| EnforceEncryption | 1 Enabled 0 Disabled |

Print Engine

| Print Engine (Common Commands) | Arguments | Reply | Security Level |
|---|---|---|---|
| LoginByCardNo | CardNo×PinCode | Status, UserInfoStruct2 | U[6] |
| LoginByUserLogon | UserLogon×Password | Status, UserInfoStruct2 | A,PU |
| Logoff | None | Status | U |
| GetPrintEngine | SourceFormat× TargetFormat | Status,{PE-IpAddr}, PE-IpPort | — |
| UpdateFromRegistry | — | — | — |
| StartGetJob | JobId×TargetFormat | FileHandle | U |
| GetJobData | FileHandle × Length | Length×Data | U |
| CancelGetJob | FileHandle | Status | U |

[6]This login request cannot be used to obtain Administrator or Power User privileges. Only LoginByUserLogon will do this. If an Administrator logs in by card number, she will be granted access to the system with user privileges only.

| Print Engine (Spec. Commands) | Arguments | Reply | Security Level |
|---|---|---|---|
| GetTransformList | None | Number×{Transform}* | U |

Broadcast Server

| Broadcast Server (UDP Command) | Arguments | Reply | Security Level |
|---|---|---|---|
| Identify | None | Ip-Addresses and port numbers for the various SafeCom components. | — |
| SetBroadcastList | {BroadCastAddress}+, GroupName | none! | — |

Note:
UDP Requests must be sent as UDP packets on port 5742 (unencrypted)

| Broadcast Server (Common Command) | Arguments | Reply | Security Level |
|---|---|---|---|
| LoginByUserLogon | UserLogon×Password | Status, UserInfoStruct2 | A,PU |
| Logoff | None | Status | U |

| Broadcast Server (Spec. Command) | Arguments | Reply | Security Level |
|---|---|---|---|
| SetConfiguration | Proprietary Win.ini like format | Status | A |
| GetConfiguration | None | Proprietary Win.ini like format | A |

Accounting Server

| Accounting Server (Common Commands) | Arguments | Reply | Security Level |
|---|---|---|---|
| LoginByCardNo | CardNo×PinCode | Status, UserInfoStruct2 | U[7] |
| LoginByUserLogon | UserLogon× Password | Status, UserInfoStruct2 | A,PU |
| Logoff | None | Status | A |
| StartAccounting | JobId x NumberOfCopies x DeviceInfoStruct DeviceInfoStruct2 | Status, SenseCode, SessionID, CreditsLeft | U |
| NotifyPagesPrinted | SessionID x AbsPageCount x PageCountModel x PageCountStatus x PageCountSenseCode x PageCountInfo | Status, SenseCode, CreditsLeft | U |
| StopAccounting | SessionID | Status, SenseCode, CreditsLeft | U |
| UpdateFromRegistry | — | — | — |

[7]This login request cannot be used to obtain Administrator or Power User privileges. Only LoginByUserLogon will do this. If an Administrator logs in by card number, she will be granted access to the system with user privileges only.

| Accounting Server (Spec. Command) | Arguments | Reply | Security Level |
|---|---|---|---|
| ExportAccountingTable | StartDate, StopDate, Separator, Target URL | Status, SenseCode, ExportCount | A |
| DeleteOldEntries | DeleteBeforeDate, Target URL | Status, SenseCode, NumberDeleted | A |

Common Commands, Detailed

UnknownReply

| | | Reply |
|---|---|---|
| Length | Field | Comment |
| 4 | NMessageLength | Length of the message |
| 4 | Ecommand | CI_UNKNOWN_REPLY |
| 2 | Nversion | Version number (set to 2) |
| 4 | Ncorrelation | Correlation to be returned by reply |
| 2 | Estatus | SC_UNSUPPORTED_VERSION SC_UNKNOWN_REQUEST |

Comments

An UnknownReply will be returned if and only if an unsupported datastream is received as a request. An unsupported datastream is either a request with an unknown 'Command' field or an unsupported version of a defined request.

LoginByCardNo

| Length | Field | Comment |
|---|---|---|
| | | Request |
| 4 | NmessageLength | Length of the message |
| 4 | Ecommand | CI_LOGIN_BY_CARD_NO_REQUEST |
| 2 | Nversion | Version number (set to 2) |
| 4 | Ncorrelation | Correlation to be returned by reply |
| 40 | SzCardNumber | The card number read on the SafeCom unit |
| 5 | SzPinCode | The pin code read on the SafeCom unit |
| | | Reply |
| 4 | NmessageLength | Length of the message |
| 4 | ECommand | CI_LOGIN_BY_CARD_NO_REPLY |
| 2 | Nversion | Version number (set to 2) |
| 4 | Ncorrelation | Correlation from Request |
| 2 | Estatus | SC_SUCCESS |
| | | SC_FAILURE |
| + | SuserInfoStruct2 | Struct describing the user |

Comments
This command can only give the client user rights to the job database.

LoginByUserLogon

| Length | Field | Comment |
|---|---|---|
| | | Request |
| 4 | NmessageLength | Length of the message |
| 4 | Ecommand | CI_LOGIN_BY_USER_LOGON_REQUEST |
| 2 | NVersion | Version number (set to 2) |
| 4 | NCorrelation | Correlation to be returned by reply |
| 21 | SzUserLogon | The user logon |
| 17 | SzPassword | User personal password |
| | | Reply |
| 4 | NMessageLength | Length of the message |
| 4 | ECommand | CI_LOGIN_BY_USER_LOGON_REPLY |
| 2 | NVersion | Version number (set to 2) |
| 4 | NCorrelation | Correlation from Request |
| 2 | EStatus | SC_SUCCESS |
| | | SC_FAILURE |
| + | SUserInfoStruct2 | Struct describing the user |

Comments
None

Logoff

| Length | Field | Comment |
|---|---|---|
| | | Request |
| 4 | NMessageLength | Length of the message |
| 4 | eCommand | CI_LOGOFF_REQUEST |
| 2 | nVersion | Version number (set to 2) |
| 4 | nCorrelation | Correlation to be returned by reply |
| | | Reply |
| 4 | nMessageLength | Length of the message |
| 4 | eCommand | CI_LOGOFF_REPLY |
| 2 | nVersion | Version number (set to 2) |
| 4 | nCorrelation | Correlation from Request |
| 2 | eStatus | SC_SUCCESS |
| | | SC_FAILURE |

Comments
None

StartGetJob

| Length | Field | Comment |
|---|---|---|
| | | Request |
| 4 | NMessageLength | Length of the message |
| 4 | ECommand | CI_START_GET_JOB_REQUEST |
| 2 | NVersion | Version number (set to 2) |
| 4 | NCorrelation | Correlation to be returned by reply |
| 4 | NJobId | Get document associated with unique job id |
| + | SFormat2 | Desired document format |
| | | Reply |
| 4 | NMessageLength | Length of the message |
| 4 | eCommand | CI_START_GET_JOB_REPLY |
| 2 | NVersion | Version number (set to 2) |
| 4 | NCorrelation | Correlation from Request |
| 2 | EStatus | SUCCESS (0) FAILURE (1) |
| 4 | NFileHandle | Handle to File |

Comments

GetJobData

| Length | Field | Comment |
|---|---|---|
| | | Request |
| 4 | NmessageLength | Length of the message |
| 4 | Ecommand | CI_GET_JOB_DATA_REQUEST |
| 2 | NVersion | Version number (set to 2) |
| 4 | NCorrelation | Correlation to be returned by reply |
| 4 | NFileHandle | Handle to file |
| 4 | NSizeOf | Size of data requested |
| | | Reply |
| 4 | NMessageLength | Length of the message |
| 4 | ECommand | CI_GET_JOB_DATA_REPLY |
| 2 | NVersion | Version number (set to 2) |
| 4 | NCorrelation | Correlation from Request |
| 2 | EStatus | SUCCESS (0) FAILURE (1) |

-continued

| Length | Field | Comment |
|---|---|---|
| 4 | NSizeOf | Size of data to be transmitted |
| + | AchData | Data |

Comments

CancelGetJob

| Length | Field | Comment |
|---|---|---|
| | | Request |
| 4 | NMessageLength | Length of the message |
| 4 | ECommand | CI_CANCEL_GET_JOB_REQUEST |
| 2 | NVersion | Version number (set to 2) |
| 4 | NCorrelation | Correlation to be returned by reply |
| 4 | NFileHandle | Handle to file |
| | | Reply |
| 4 | NMessageLength | Length of the message |
| 4 | ECommand | CI_CANCEL_GET_JOB_REPLY |
| 2 | NVersion | Version number (set to 2) |
| 4 | NCorrelation | Correlation from Request |
| 2 | EStatus | SUCCESS (0) |
| | | FAILURE (1) |

DeleteJob

| Length | Field | Comment |
|---|---|---|
| | | Request |
| 4 | NMessageLength | Length of the message |
| 4 | ECommand | CI_DELETE_JOB_REQUEST |
| 2 | NVersion | Version number (set to 2) |
| 4 | NCorrelation | Correlation to be returned by reply |
| 4 | NUniqueIdJob | The unique id of the job |
| Reply | | |
| 4 | NMessageLength | Length of the message |
| 4 | ECommand | CI_DELETE_JOB_REPLY |
| 2 | nVersion | Version number (set to 2) |
| 4 | nCorrelation | Correlation from Request |
| 2 | eStatus | SC_SUCCESS |
| | | SC_FAILURE |
| | | SC_PENDING_DELETE |

Comments
SC_PENDING_DELETE means that the job was in use by someone else, and will be deleted automatically by the Job Database as soon as it is released.

GetPrintEngine

| Length | Field | Comment |
|---|---|---|
| | | Request |
| 4 | NMessageLength | Length of the message |
| 4 | ECommand | CI_GET_PRINT_ENGINE_REQUEST |
| 2 | NVersion | Version number (set to 2) |
| 4 | NCorrelation | Correlation to be returned by reply |
| + | SFormat2 | Source format |
| + | SFormat2 | Target format |
| Reply | | |
| 4 | NMessageLength | Length of the message |
| 4 | ECommand | CI_GET_PRINT_ENGINE_REPLY |
| 2 | NVersion | Version number (set to 2) |

-continued

| Length | Field | Comment |
|---|---|---|
| 4 | NCorrelation | Correlation from Request |
| 2 | EStatus | SC_SUCCESS |
| | | SC_FAILURE |
| 2 | NPort | The port number of the Print Engine |
| 4 | NNumberOfIpAddr | Number of ip addresses in the list |
| + | {achIpAddr}* | IP Addresses of the Print Engine |

Comments

SetDeviceInfo

| Length | Field | Comment |
|---|---|---|
| | | Request |
| 4 | NMessageLength | Length of the message |
| 4 | ECommand | CI_SET_DEVICE_INFO_REQUEST |
| 2 | NVersion | Version number (set to 2) |
| 4 | NCorrelation | Correlation to be returned by reply |
| 4 | NNumberOfDevices | Entries in list below |
| + | {sDeviceInfoStruct2}+ | Information about the device |
| Reply | | |
| 4 | NMessageLength | Length of the message |
| 4 | ECommand | CI_SET_DEVICE_INFO_REPLY |
| 2 | NVersion | Version number (set to 2) |
| 4 | NCorrelation | Correlation from Request |
| 2 | EStatus | SC_SUCCESS, SC_FAILURE |
| 2 | ESenseCode | Ok(0) |

Comments:

GetDeviceInfo

| Length | Field | Comment |
|---|---|---|
| | | Request |
| 4 | NMessageLength | Length of the message |
| 4 | eCommand | CI_GET_DEVICE_INFO_REQUEST |
| 2 | nVersion | Version number (set to 2) |
| 4 | nCorrelation | Correlation to be returned by reply |
| Reply | | |
| 4 | nMessageLength | Length of the message |
| 4 | eCommand | CI_GET_DEVICE_INFO_REPLY |
| 2 | nVersion | Version number (set to 2) |
| 4 | nCorrelation | Correlation from Request |
| 2 | eStatus | SC_SUCCESS, SC_FAILURE |
| 2 | eSenseCode | Ok(0) |
| 4 | nNumberOfDevices | Entries in list below |
| + | {sDeviceInfoStruct2}+ | Information about the device |

Comments

NotifyDeviceIrq

| Length | Field | Comment |
|---|---|---|
| | | Request |
| 4 | NmessageLength | Length of the message |
| 4 | ECommand | CI_NOTIFY_DEVICE_IRQ_REQUEST |
| 2 | NVersion | Version number |
| 4 | NCorrelation | Correlation to be returned by reply |
| 4 | NNumberOfDevices | Entries in list below |

-continued

| Length | Field | Comment |
|---|---|---|
| + | {sDeviceInfoStruct2}+ | Information about the device |
| Reply | | |
| 4 | NMessageLength | Length of the message |
| 4 | ECommand | CI_NOTIFY_DEVICE_IRQ_REPLY |
| 2 | NVersion | Version number |
| 4 | NCorrelation | Correlation from Request |
| 2 | EStatus | SC_SUCCESS, SC_FAILURE |
| 2 | ESenseCode | Ok(0) |

Comments

ChangePinCode

| Length | Field | Comment |
|---|---|---|
| | | Request |
| 4 | NMessageLength | Length of the message |
| 4 | eCommand | CI_CHANGE_PIN_CODE_REQUEST |
| 2 | nVersion | Version number (set to 2) |
| 4 | nCorrelation | Correlation to be returned by reply |
| 5 | szNewPINCode | Old pin has been entered again and new PIN, has been entered twice and checked |
| Reply | | |
| 4 | nMessageLength | Length of the message |
| 4 | eCommand | CI_CHANGE_PIN_CODE_REPLY |
| 2 | nVersion | Version number (set to 2) |
| 4 | nCorrelation | Correlation from Request |
| 2 | eStatus | SC_SUCCESS, SC_FAILURE |

Comments

OpenCard

| Length | Field | Comment |
|---|---|---|
| | | Request |
| 4 | NMessageLength | Length of the message |
| 4 | ECommand | CI_OPEN_CARD_REQUEST |
| 2 | NVersion | Version number (set to 2) |
| 4 | NCorrelation | Correlation to be returned by reply |
| 40 | SzCardNumber | Card number to be opened |
| 9 | SzPUKCode | Code authenticating the user |
| 5 | SzPINCode | The users PINCode |
| Reply | | |
| 4 | NMessageLength | Length of the message |
| 4 | Ecommand | CI_OPEN_CARD _REPLY |
| 2 | Nversion | Version number (set to 2) |
| 4 | Ncorrelation | Correlation from Request |
| 2 | Estatus | SC_SUCCESS SC_FAILURE |
| + | SzMessage | Message to the user |

Comments

GetPrinters

| Length | Field | Comment |
|---|---|---|
| | | Request |
| 4 | NmessageLength | Length of the message |
| 4 | ECommand | CI_GET_PRINTERS_REQUEST |
| 2 | NVersion | Version number (set to 2) |
| 4 | NCorrelation | Correlation to be returned by reply |
| Reply | | |
| 4 | NMessageLength | Length of the message |
| 4 | ECommand | CI_GET_PRINTERS_REPLY |
| 2 | NVersion | Version number (set to 2) |
| 4 | nCorrelation | Correlation from Request |
| 2 | EStatus | SC_SUCCESS/SC_FAILURE |
| 4 | NSizeOfNames | Length of the printer names list |
| 4 | NNumberOfNames | Number of names in the list |
| + | {szPrinterNames}* | A list of zero terminated printer names |

Comments
All documents are tagged with the name of the device driver that generated it. This request is used to retrieve all device-driver-names in the database, so that the FE can display this list during configuration.

StartAccounting

| Length | Field | Comment |
|---|---|---|
| | | Request |
| 4 | NMessageLength | Length of the message |
| 4 | ECommand | CI_START_ACCOUNTING_REQUEST |
| 2 | NVersion | Version number (set to 2) |
| 4 | NCorrelation | Correlation to be returned by reply |
| 4 | NJobId | JobId of job to be accounted |
| 2 | NNumberOfCopies | Number of copies requested by user |
| + | SDeviceInfoStruct2 | Information about the device |
| Reply | | |
| 4 | NMessageLength | Length of the message |
| 4 | ECommand | CI_START_ACCOUNTING_REPLY |
| 2 | NVersion | Version number (set to 2) |
| 4 | NCorrelation | Correlation from Request |
| 2 | EStatus | SC_SUCCESS/SC_FAILURE |
| 2 | ESenseCode | Ok(0), Accounting NotSupported(1), Accounting NotEnabled ForUser(2) |
| 4 | NSessionID | Unique id identifying the accounting session |
| 8 | NCreditsLeft (double) | Credits for the user |

Comments
AccountingNotSupported has higher precedence than Accounting NotEnabledForUser

StopAccounting

| Length | Field | Comment |
|---|---|---|
| | | Request |
| 4 | nMessageLength | Length of the message |
| 4 | eCommand | CI_STOP_ACCOUNTING_REQUEST |
| 2 | nVersion | Version number (set to 2) |
| 4 | nCorrelation | Correlation to be returned by reply |
| 4 | nSessionID | Unique id identifying a session |
| Reply | | |
| 4 | nMessageLength | Length of the message |
| 4 | eCommand | CI_STOP_ACCOUNTING_REPLY |
| 2 | nVersion | Version number (set to 2) |
| 4 | nCorrelation | Correlation from Request |
| 2 | eStatus | SC_SUCCESS/SC_FAILURE |
| 2 | eSenseCode | Ok(0), UnknownSessionId(1) |
| 8 | nCreditsLeft (double) | Credits for the user |

Comments

NotifyPagesPrinted

| Length | Field | Comment |
|---|---|---|
| | | Request |
| 4 | nMessageLength | Length of the message |
| 4 | eCommand | CI_NOTIFY_PAGES_PRINTED_REQUEST |
| 2 | nVersion | Version number (set to 2) |
| 4 | nCorrelation | Correlation to be returned by reply |
| 4 | nSessionID | Unique id identifying a session |
| 4 | nAbsPageCount | Number of pages printed in total |
| 2 | nPageCountModel | SW(0), HW(1) |
| 4 | nPageCountStatus | 0(Ok), 1(Undefined), 2(Failure) |
| 4 | nPageCountSenseCode | 0(Ok), 2(Failure), 3(PaperJam), 4(PaperOut), (5)ProbeError |
| + | szPageCountInfo | Descriptive text (zero terminated) |
| | | Reply |
| 4 | nMessageLength | Length of the message |
| 4 | eCommand | CI_NOTIFY_PAGES_PRINTED_REPLY |
| 2 | nVersion | Version number (set to 2) |
| 4 | nCorrelation | Correlation from Request |
| 2 | eStatus | SC_SUCCESS/SC_FAILURE |
| 2 | eSenseCode | Ok(0), UnknownSessionId(1), CreditShortage(2) |
| 8 | nCreditsLeft | Credits for the user |

Comments

UpdateFromRegistry

| Length | Field | Comment |
|---|---|---|
| | | Request |
| 4 | nMessageLength | Length of the message |
| 4 | eCommand | CI_UPDATE_FROM_REGISTY_REQUEST |
| 2 | nVersion | Version number (set to 2) |
| 4 | nCorrelation | Correlation to be returned by reply |
| | | Reply |
| 4 | nMessageLength | Length of the message |
| 4 | eCommand | CI_UPDATE_FROM_REGISTY_REPLY |
| 2 | nVersion | Version number (set to 2) |
| 4 | nCorrelation | Correlation from Request |
| 2 | eStatus | SC_SUCCESS, SC_FAILURE |

Comments

Safecom Server—Specialized Commands, Detailed
GetPrintJobInfoList

| Length | Field | Comment |
|---|---|---|
| | | Request |
| 4 | NMessageLength | Length of the message |
| 4 | eCommand | SS_GET_JOB_INFO_LIST_REQUEST |
| 2 | nVersion | Version number (set to 2) |
| 4 | nCorrelation | Correlation to be returned by reply |
| | | Reply |
| 4 | nMessageLength | Length of the message |
| 4 | eCommand | SS_GET_JOB_INFO_LIST_REPLY |
| 2 | nVersion | Version number (set to 2) |
| 4 | nCorrelation | Correlation from Request |
| 2 | eStatus | SC_SUCCESS, SC_FAILURE |
| 4 | nNumberOfJobs | Elements in list below |
| + | {sPrintJobInfoStruct2} + | Array of PrintJobInfoStructs |

Comments

GetPrintEngine (Comment)
Comments

The task of this command is to supply the Control Unit with an address of a print engine that is capable of delivering the job in the right format. Since we do not yet have hardware independent format the target and document format are the same and the request will be to find any available print engine. By specifying source and taget format, we basically ask for a PrintEngine capable of transforming from one format to the other.

Job Database—Specialized Commands, Detailed

ValidUserByCardNo

| Length | Field | Comment |
|---|---|---|
| | | Request |
| 4 | nMessageLength | Length of the message |
| 4 | eCommand | JDB_VALIDATE_USER_BY_CARD_NO_REQUEST |
| 2 | nVersion | Version number (set to 2) |
| 4 | nCorrelation | Correlation to be returned by reply |
| 40 | szCardNo | Card number read on the SafeCom unit - zero terminated |
| | | Reply |
| 4 | nMessageLength | Length of the message |
| 4 | eCommand | JDB_VALIDATE_USER_BY_CARD_NO_REPLY |
| 2 | nVersion | Version number (set to 2) |
| 4 | nCorrelation | Correlation from Request |
| 2 | eStatus | USER_VALID<br>USER_INVALID<br>USER_IS_BLOCKED<br>FAILURE |
| 4 | nUserId | An unique id identifing the user |

Comments

This command checks if a user with a specific card number exits in the database. Clients can only perform this command with a security level of Power User or Administrator.

ValidUserByUserLogon

| Length | Field | Comment |
|---|---|---|
| | | Request |
| 4 | nMessageLength | Length of the message |
| 4 | eCommand | JDB_VALIDATE_USER_BY_USER_LOGON_REQUEST |
| 2 | nVersion | Version number (set to 2) |
| 4 | nCorrelation | Correlation to be returned by reply |
| 21 | szUserLogon | Asc-ii user logon - zero terminated |
| | | Reply |
| 4 | nMessageLength | Length of the message |
| 4 | eCommand | JDB_VALIDATE_USER_BY_USER_LOGON_REPLY |
| 2 | nVersion | Version number (set to 2) |
| 4 | nCorrelation | Correlation from Request |
| 2 | eStatus | USER_VALID<br>USER_INVALID<br>USER_IS_BLOCKED<br>FAILURE |
| 4 | nUserId | An unique id identifing the user |

Comments

This command checks if a user with a specific user id exits in the database. Clients can only perform this command with a security level of Power User or Administrator.

StartAddJob

| Length | Field | Comment |
|---|---|---|
| | | Request |
| 4 | NMessageLength | Length of the message |
| 4 | eCommand | JDB_START_ADD_JOB_REQUEST |
| 2 | nVersion | Version number (set to 2) |
| 4 | nCorrelation | Correlation to be returned by reply |
| + | sJobInfoStruct2 | Information about job |
| 4 | Add. Data Length | Length of additional data |
| + | Add. Data | Additional data |
| | | Reply |
| 4 | nMessageLength | Length of the message |
| 4 | eCommand | JDB_START_ADD_JOB_REPLY |
| 2 | nVersion | Version number (set to 2) |
| 4 | nCorrelation | Correlation from Request |
| 4 | nFileHandle | FileHandle for file |

Comments
The job is added in the context of the user who has logged on.

StartAddJobByUserId

| Length | Field | Comment |
|---|---|---|
| | | Request |
| 4 | NmessageLength | Length of the message |
| 4 | ECommand | JDB_START_ADD_JOB_BY_USER_ID_REQUEST |
| 2 | NVersion | Version number (set to 2) |
| 4 | NCorrelation | Correlation to be returned by reply |
| 4 | NUserId | User indetification |
| + | SJobInfoStruct 2 | Information about job |
| 4 | Add. Data Length | Length of additional data |
| + | Add. Data | Additional data |
| | | Reply |
| 4 | NMessageLength | Length of the message |
| 4 | eCommand | JDB_START_ADD_JOB_BY_USER_ID_REPLY |
| 2 | nVersion | Version number (set to 2) |
| 4 | nCorrelation | Correlation from Request |
| 4 | nFileHandle | FileHandle for file |

Comments
The job is added using a unique user Id.

AddJobData

| Length | Field | Comment |
|---|---|---|
| | | Request |
| 4 | NMessageLength | Length of the message |
| 4 | ECommand | JDB_ADD_JOB_DATA_REQUEST |
| 2 | NVersion | Version number (set to 2) |
| 4 | NCorrelation | Correlation to be returned by reply |
| 4 | NFilehandle | Handle to file |
| 4 | NSizeOf | Size of data |
| + | AchData | Job data |
| | | Reply |
| 4 | NMessageLength | Length of the message |
| 4 | ECommand | JDB_ADD_JOB_DATA_REPLY |
| 2 | NVersion | Version number (set to 2) |
| 4 | NCorrelation | Correlation from Request |
| 2 | EStatus | Success/Failure |

Comments
The doc data is sent in chunks with ctrl signal in between. The unique id returned by the command on success can be used in the job specific command in the interface.

CommitJob

| Length | Field | Comment |
|---|---|---|
| | | Request |
| 4 | NMessageLength | Length of the message |
| 4 | ECommand | JDB_COMMIT_JOB_REQUEST |
| 2 | NVersion | Version number (set to 2) |
| 4 | NCorrelation | Correlation to be returned by reply |
| 4 | NFilehandle | Handle to file |
| 4 | NPages | Pages in print job ← WHY (RWB)? |
| | | Reply |
| 4 | NMessageLength | Length of the message |
| 4 | ECommand | JDB_COMMIT_JOB_REPLY |
| 2 | NVersion | Version number (set to 2) |
| 4 | NCorrelation | Correlation from Request |
| 2 | EStatus | Success/Failure |

Comments

CancelAddJob

| Length | Field | Comment |
|---|---|---|
| | | Request |
| 4 | nMessageLength | Length of the message |
| 4 | eCommand | JDB_CANCEL_ADD_JOB_REQUEST |
| 2 | nVersion | Version number (set to 2) |
| 4 | nCorrelation | Correlation to be returned by reply |
| 4 | nFilehandle | Handle to file |
| | | Reply |
| 4 | nMessageLength | Length of the message |
| 4 | eCommand | JDB_CANCEL_ADD_JOB_REPLY |
| 2 | nVersion | Version number (set to 2) |
| 4 | nCorrelation | Correlation from Request |
| 2 | eStatus | Success/Failure |

Comments

SetJobinfo

| Length | Field | Comment |
|---|---|---|
| | | Request |
| 4 | nMessageLength | Length of the message |
| 4 | eCommand | JDB_SET_JOB_INFO_REQUEST |
| 2 | nVersion | Version number (set to 2) |
| 4 | nCorrelation | Correlation to be returned by reply |
| 4 | nJobId | The jobs unique id |
| + | sJobInfoStruct2 | Struct with the new attributes |
| | | Reply |
| 4 | nMessageLength | Length of the message |
| 4 | eCommand | JDB_SET_JOB_INFO_REPLY |
| 2 | nVersion | Version number (set to 2) |
| 4 | nCorrelation | Correlation from Request |
| 2 | eStatus | SUCCESS, FAILURE |
| + | szMessage | Message for user if fail - zero terminated |

Comments

GetJobInfoList

| Length | Field | Comment |
|---|---|---|
| | | Request |
| 4 | NMessageLength | Length of the message |
| 4 | ECommand | JDB_GET_JOB_INFO_LIST_REQUEST |
| 2 | NVersion | Version number (set to 2) |
| 4 | Ncorrelation | Correlation to be returned by reply |
| | | Reply |
| 4 | NmessageLength | Length of the message |
| 4 | Ecommand | JDB_GET_JOB_INFO_LIST_REPLY |
| 2 | Nversion | Version number (set to 2) |
| 4 | Ncorrelation | Correlation from Request |
| 2 | Estatus | SC_SUCCESS, SC_FAILURE |
| 4 | NNumberOfJobs | Elements in list below |
| + | {sJobInfoStruct2} + | Job information |

Comments

GetJobInfoListByUserId

| Length | Field | Comment |
|---|---|---|
| | | Request |
| 4 | NMessageLength | Length of the message |
| 4 | ECommand | JDB_GET_JOB_INFO_LIST_BY_USER_ID_REQUEST |
| 2 | NVersion | Version number (set to 2) |
| 4 | NCorrelation | Correlation to be returned by reply |
| 4 | NUserId | Users unique id |
| | | Reply |
| 4 | NMessageLength | Length of the message |
| 4 | ECommand | JDB_GET_JOB_INFO_LIST_BY_USER_ID_REPLY |
| 2 | NVersion | Version number (set to 2) |
| 4 | NCorrelation | Correlation from Request |
| 2 | EStatus | SC_SUCCESS, SC_FAILURE |

-continued

| Length | Field | Comment |
|---|---|---|
| 4 | NNoJobs | The number of jobs struct |
| + | {sJobInfoStruct2} + | Job information |

Comments

GetUserInfo

| Length | Field | Comment |
|---|---|---|
| | | Request |
| 4 | NmessageLength | Length of the message |
| 4 | ECommand | JDB_GET_USER_INFO_REQUEST |
| 2 | NVersion | Version number (set to 2) |
| 4 | NCorrelation | Correlation to be returned by reply |
| | | Reply |
| 4 | NMessageLength | Length of the message |
| 4 | ECommand | JDB_GET_USER_INFO_REPLY |
| 2 | NVersion | Version number (set to 2) |

-continued

| Length | Field | Comment |
|---|---|---|
| 4 | NCorrelation | Correlation from Request |
| 2 | eStatus | SC_SUCCESS, SC_FAILURE |
| + | SUserInfoStruct2 | Struct describing the user |

Comments

This command gives a limited info about the user.

GetUserInfoList

| Length | Field | Comment |
|---|---|---|
| | | Request |
| 4 | NMessageLength | Length of the message |
| 4 | eCommand | JDB_GET_USER_INFO_LIST_REQUEST |
| 2 | nVersion | Version number (set to 2) |
| 4 | nCorrelation | Correlation to be returned by reply |
| | | Reply |
| 4 | nMessageLength | Length of the message |
| 4 | eCommand | JDB_GET_USER_INFO_LIST_REPLY |
| 2 | nVersion | Version number (set to 2) |
| 4 | nCorrelation | Correlation from Request |
| 2 | eStatus | SC_SUCCESS, SC_FAILURE |
| 4 | nNoUsers | Number of users |
| + | {sUserinfoStruct2}+ | Array of user info structs |

Comments
This command is for Administrator only.

GetUserInfoByUserId

| Length | Field | Comment |
|---|---|---|
| | | Request |
| 4 | Nmessage-Length | Length of the message |
| 4 | ECommand | JDB_GET_USER_INFO_BY_USER_ID_REQUEST |
| 2 | NVersion | Version number (set to 2) |
| 4 | NCorrelation | Correlation to be returned by reply |
| 4 | NUserId | Unique id of a user |
| | | Reply |
| 4 | NMessageLength | Length of the message |
| 4 | ECommand | JDB_GET_USER_INFO_BY_USER_ID_REPLY |
| 2 | NVersion | Version number (set to 2) |
| 4 | NCorrelation | Correlation from Request |
| 2 | EStatus | SC_SUCCESS, SC_FAILURE |

-continued

| Length | Field | Comment |
|---|---|---|
| + | SUserInfoStruct2 | Struct describing the user |

Comments
This command is for Administrator only.

DeleteUser

| Length | Field | Comment |
|---|---|---|
|  |  | Request |
| 4 | NMessageLength | Length of the message |
| 4 | ECommand | JDB_DELETE_USER_REQUEST |
| 2 | NVersion | Version number (set to 2) |
| 4 | NCorrelation | Correlation to be returned by reply |
| 4 | NUserId | Unique id of the user |
|  |  | Reply |
| 4 | nMessageLength | Length of the message |
| 4 | eCommand | JDB_DELETE_USER_REPLY |
| 2 | nVersion | Version number (set to 2) |
| 4 | nCorrelation | Correlation from Request |
| 2 | eStatus | SC_SUCCESS, SC_FAILURE |

Comments
This command is for Administrator only.

AddUser

| Length | Field | Comment |
|---|---|---|
|  |  | Request |
| 4 | nMessageLength | Length of the message |
| 4 | eCommand | JDB_ADD_USER_REQUEST |
| 2 | nVersion | Version number (set to 2) |
| 4 | nCorrelation | Correlation to be returned by reply |
| + | sUserInfoStruct2 | Struct describing user info |
|  |  | Reply |
| 4 | nMessageLength | Length of the message |
| 4 | eCommand | JDB_ADD_USER_REPLY |
| 2 | nVersion | Version number (set to 2) |
| 4 | nCorrelation | Correlation from Request |
| 2 | eStatus | SUCCESS<br>FAILURE<br>USER_NAME_EXITS<br>USER_CARDNO_EXITS |

Comments
This command is for Administrator only.

ModifyUser

| Length | Field | Comment |
|---|---|---|
|  |  | Request |
| 4 | nMessageLength | Length of the message |
| 4 | eCommand | JDB_MODIFY_USER_REQUEST |
| 2 | nVersion | Version number (set to 2) |
| 4 | nCorrelation | Correlation to be returned by reply |
| + | sUserInfoStruct2 | Struct describing user info |
|  |  | Reply |
| 4 | NMessageLength | Length of the message |
| 4 | ECommand | JDB_MODIFY_USER_REPLY |
| 2 | NVersion | Version number (set to 2) |
| 4 | NCorrelation | Correlation from Request |
| 2 | eStatus | SC_SUCCES, SC_FAILURE |

Comments
This command is for Administrator only.

AddPrinter

| Length | Field | Comment |
|---|---|---|
|  |  | Request |
| 4 | NMessageLength | Length of the message |
| 4 | ECommand | JDB_ADD_PRINTER_REQUEST |
| 2 | NVersion | Version number (set to 2) |
| 4 | NCorrelation | Correlation to be returned by reply |
| + | SzPrinterName | Zero terminated string describing the printername |
|  |  | Reply |
| 4 | NMessageLength | Length of the message |
| 4 | ECommand | JDB_ADD_PRINTER_REPLY |
| 2 | NVersion | Version number (set to 2) |
| 4 | nCorrelation | Correlation from Request |
| 2 | sStatus | SC_SUCCES, SC_FAILURE |

Comments
This command is an open command.

RemovePrinter

| Length | Field | Comment |
|---|---|---|
| Request |  |  |
| 4 | nMessageLength | Length of the message |
| 4 | eCommand | JDB_REMOVE_PRINTER_REQUEST |
| 2 | nVersion | Version number (set to 2) |
| 4 | nCorrelation | Correlation to be returned by reply |
| + | szPrinterName | Zero terminated string describing the printername |
| Reply |  |  |
| 4 | nMessageLength | Length of the message |
| 4 | eCommand | JDB_REMOVE_PRINTER_REPLY |
| 2 | nVersion | Version number (set to 2) |
| 4 | nCorrelation | Correlation from Request |
| 2 | eStatus | SC_SUCCES, SC_FAILURE |

Comments
This command is an open command.

AddFaktura

| Length | Field | Comment |
|---|---|---|
| Request | | |
| 4 | nMessageLength | Length of the message |
| 4 | eCommand | JDB_ADD_FAKTURA_REQUEST |
| 2 | nVersion | Version number (set to 2) |
| 4 | nCorrelation | Correlation to be returned by reply |
| + | FakturaInfoStruct2 | Faktura info struct to add |
| Reply | | |
| 4 | nMessageLength | Length of the message |
| 4 | eCommand | JDB_ADD_FAKTURA_REPLY |
| 2 | nVersion | Version number (set to 2) |
| 4 | nCorrelation | Correlation from Request |
| 2 | sStatus | SC_SUCCES, SC_FAILURE |

Comments

ModifyFaktura

| Length | Field | Comment |
|---|---|---|
| Request | | |
| 4 | NMessageLength | Length of the message |
| 4 | ECommand | JDB_MODIFY_FAKTURA_REQUEST |
| 2 | NVersion | Version number (set to 2) |
| 4 | NCorrelation | Correlation to be returned by reply |
| + | FakturaInfoStruct2 | Faktura info struct to modify |
| Reply | | |
| 4 | NMessageLength | Length of the message |
| 4 | ECommand | JDB_MODIFY_FAKTURA_REPLY |
| 2 | NVersion | Version number (set to 2) |
| 4 | NCorrelation | Correlation from Request |
| 2 | sStatus | SC_SUCCES, SC_FAILURE |

Comments

RemoveFaktura

| Length | Field | Comment |
|---|---|---|
| Request | | |
| 4 | NMessageLength | Length of the message |
| 4 | ECommand | JDB_REMOVE_FAKTURA_REQUEST |
| 2 | NVersion | Version number (set to 2) |
| 4 | nCorrelation | Correlation to be returned by reply |
| 4 | FakturaId | Faktura id to remove |
| Reply | | |
| 4 | nMessageLength | Length of the message |
| 4 | eCommand | JDB_REMOVE_FAKTURA_REPLY |
| 2 | nVersion | Version number (set to 2) |
| 4 | nCorrelation | Correlation from Request |
| 2 | sStatus | SC_SUCCES, SC_FAILURE |

Comments

GetFakturaList

| Length | Field | Comment |
|---|---|---|
| Request | | |
| 4 | NMessageLength | Length of the message |
| 4 | ECommand | JDB_GET_FAKTURA_LIST_REQUEST |
| 2 | NVersion | Version number (set to 2) |
| 4 | nCorrelation | Correlation to be returned by reply |
| Reply | | |
| 4 | nMessageLength | Length of the message |
| 4 | eCommand | JDB_GET_FAKTURA_LIST_REPLY |
| 2 | nVersion | Version number (set to 2) |
| 4 | nCorrelation | Correlation from Request |
| 2 | sStatus | SC_SUCCES SC_FAILURE |
| 4 | nFakturaNo | Number faktura info structs in list |
| + | {FakturaInfoStruct2}+ | List of faktura info structs |

Comments

GetFakturaById

| Length | Field | Comment |
|---|---|---|
| Request | | |
| 4 | nMessageLength | Length of the message |
| 4 | eCommand | JDB_GET_FAKTURA_BY_ID_REQUEST |
| 2 | nVersion | Version number (set to 2) |
| 4 | nCorrelation | Correlation to be returned by reply |
| 4 | FakturaId | Faktura id |
| Reply | | |
| 4 | nMessageLength | Length of the message |
| 4 | eCommand | JDB_GET_FAKTURA_BY_ID_REPLY |
| 2 | nVersion | Version number (set to 2) |
| 4 | nCorrelation | Correlation from Request |
| 2 | sStatus | SC_SUCCES, SC_FAILURE |
| + | FakturaInfoStruct2 | Faktura info struct |

Comments

AllowUserToNid

| Length | Field | Comment |
|---|---|---|
| Request | | |
| 4 | nMessageLength | Length of the message |
| 4 | eCommand | JDB_ALLOW_USER_TO_NID_REQUEST |
| 2 | nVersion | Version number (set to 2) |
| 4 | nCorrelation | Correlation to be returned by reply |
| 4 | UserNID | User unique node id to allow to NID |
| 4 | NID | Node Id |
| Reply | | |
| 4 | nMessageLength | Length of the message |
| 4 | eCommand | JDB_ALLOW_USER_TO_NID_REPLY |
| 2 | nVersion | Version number (set to 2) |
| 4 | nCorrelation | Correlation from Request |
| 2 | sStatus | SC_SUCCES, SC_FAILURE |

Comments

DenyUserFromNid

| Length | Field | Comment |
|---|---|---|
| Request | | |
| | | Request |
| 4 | nMessageLength | Length of the message |
| 4 | eCommand | JDB_DENY_USER_FROM_NID_REQUEST |
| 2 | nVersion | Version number (set to 2) |
| 4 | nCorrelation | Correlation to be returned by reply |
| 4 | UserNID | User unique node id to remove from NID |
| 4 | NID | Node id |
| Reply | | |
| 4 | nMessageLength | Length of the message |
| 4 | eCommand | JDB_DENY_USER_FROM_NID_REPLY |
| 2 | nVersion | Version number (set to 2) |
| 4 | nCorrelation | Correlation from Request |
| 2 | sStatus | SC_SUCCES, SC_FAILURE |

Comments

GetUsersAllowedToNid

| Length | Field | Comment |
|---|---|---|
| Request | | |
| 4 | NMessageLength | Length of the message |
| 4 | ECommand | JDB_GET_USER_ALLOWS_NID_REQUEST |
| 2 | nVersion | Version number (set to 2) |
| 4 | nCorrelation | Correlation to be returned by reply |
| 4 | MD | Node Id |
| Reply | | |
| 4 | nMessageLength | Length of the message |
| 4 | eCommand | JDB_GET_USERS_ALLOW_NID_REPLY |
| 2 | nVersion | Version number (set to 2) |
| 4 | nCorrelation | Correlation from Request |
| 2 | sStatus | SC_SUCCES, SC_FAILURE |
| 4 | nNidNo | Number of nids in list |
| + | {NID}+ | List of nids |

Comments

GetGraphByNid

| Length | Field | Comment |
|---|---|---|
| Request | | |
| 4 | NMessageLength | Length of the message |
| 4 | ECommand | JDB_GET_GRAPH_BY_NID_REQUEST |
| 2 | NVersion | Version number (set to 2) |
| 4 | NCorrelation | Correlation to be returned by reply |
| 4 | NID | Node Id |
| Reply | | |
| 4 | NMessageLength | Length of the message |
| 4 | ECommand | JDB_GET_GRAPH_BY_NID_REPLY |
| 2 | nVersion | Version number (set to 2) |
| 4 | nCorrelation | Correlation from Request |
| 2 | sStatus | SC_SUCCES, SC_FAILURE |
| + | Graph | Recursive list of Safecom structs |

Comments

LinkNidToNid

| Length | Field | Comment |
|---|---|---|
| | | Request |
| 4 | nMessageLength | Length of the message |
| 4 | eCommand | JDB_LINK_NID_TO_NID_REQUEST |
| 2 | nVersion | Version number (set to 2) |
| 4 | nCorrelation | Correlation to be returned by reply |
| 4 | NID | Node id |
| 4 | NID | Node id |
| | | Reply |
| 4 | nMessage Length | Length of the message |
| 4 | eCommand | JDB_LINK_NID_TO_NID_REPLY |
| 2 | nVersion | Version number (set to 2) |
| 4 | nCorrelation | Correlation from Request |
| 2 | sStatus | SC_SUCCES, SC_FAILURE |

Comments

UnLinkNidToNid

| Length | Field | Comment |
|---|---|---|
| | | Request |
| 4 | nMessageLength | Length of the message |
| 4 | eCommand | JDB_UNLINK_NID_TO_NID_REQUEST |
| 2 | nVersion | Version number (set to 2) |
| 4 | nCorrelation | Correlation to be returned by reply |
| 4 | NID | Node id |
| 4 | NID | Node id |
| | | Reply |
| 4 | nMessageLength | Length of the message |
| 4 | eCommand | JDB_UNLINK_NID_TO_NID_REPLY |
| 2 | nVersion | Version number (set to 2) |
| 4 | nCorrelation | Correlation from Request |
| 2 | sStatus | SC_SUCCES, SC_FAILURE |

Comments

Print Engine—Specialized Commands, Detailed

GetTransformList

| Length | Field | Comment |
|---|---|---|
| | | Request |
| 4 | nMessageLength | Length of the message |
| 4 | eCommand | PE_GET_TRANSFORM_LIST_REQUEST |
| 2 | nVersion | Version number (set to 2) |
| 4 | nCorrelation | Correlation to be returned by reply |
| | | Reply |
| 4 | nMessageLength | Length of the message |
| 4 | eCommand | PE_GET_TRANSFORM_LIST_REPLY |
| 2 | nVersion | Version number (set to 2) |
| 4 | nCorrelation | Correlation from Request |
| 2 | eStatus | SC_SUCCESS, SC_FAILURE |
| 4 | nNumber of transforms | |
| + | {sFormat2 × sFormat2}+ | {SourceFormat×TargetFormat}+ |

Comments

Accounting Server—Specialized Commands, Detailed

ExportAccountingTable

| Length | Field | Comment |
|---|---|---|
| | | Request |
| 4 | NMessageLength | Length of the message |
| 4 | Command | EXPORT_ACCOUNTING_DATA_REQUEST |
| 2 | NVersion | Version number (set to 2) |
| 4 | NCorrelation | Correlation to be returned by reply |
| 1 | CSeparator | Separator character in exported dataset |
| 16 | AchStartDate[8] | Export accounting info from this date (SYSTEMTIME structure) |
| 16 | AchStopDate | Export accounting info up to this date (SYSTEMTIME structure) |
| + | SzTargetURL | File name incl. drive and path |
| | | Reply |
| 4 | BMessageLength | Length of the message |
| 4 | eCommand | EXPORT_ACCOUNTING_DATA_REPLY |
| 2 | nVersion | Version number (set to 2) |
| 4 | bCorrelation | Correlation from Request |
| 2 | eStatus | SC_SUCCESS, SC_FAILURE |
| 2 | eSenseCode | Ok(0), AccountingNotSupported(1) |
| 4 | nExportCount | Number of exported entries |

Comments

DeleteOldEntries

| Length | Field | Comment |
|---|---|---|
| | | Request |
| 4 | nMessageLength | Length of the message |
| 4 | eCommand | DELETE_OLD_ENTRIES_REQUEST |
| 2 | nVersion | Version number (set to 2) |
| 4 | nCorrelation | Correlation to be returned by reply |
| 16 | achDeleteBeforeDate | (SYSTEMTIME structure) |
| | | Reply |
| 4 | NMessageLength | Length of the message |
| 4 | eCommand | DELETE_OLD_ENTRIES_REPLY |
| 2 | nVersion | Version number (set to 2) |
| 4 | nCorrelation | Correlation from Request |
| 2 | eStatus | SC_SUCCESS, SC_FAILURE |
| 2 | eSenseCode | Ok(0), Accounting NotSupported |
| 4 | nNumberDeleted | Number removed from database |

Comments
[8]If the start or stop date is filled with zeroes it means "all data" in the respective direction.

Broadcast Server—Specialized Commands, Detailed

Identify [UDP]

| Length | Field | Comment |
|---|---|---|
| | | Request |
| 4 | nMessageLength | Length of the message |
| 4 | eCommand | BS_IDENTIFY_REQUEST |
| 2 | nVersion | Version number (set to 2) |
| 4 | nCorrelation | Correlation to be returned by reply |
| 4 | achMask | Bitfield defining search criteria 0x01: Print Engine 0x02: SafeCom Server 0x04: Port Monitor 0x08: Job Database 0x10: Accounting Server |
| 20 | szGroup | String telling which groups that's going to be identified. If empty (ie "") its identify all group. |
| | | Reply |
| 4 | nMessageLength | Length of the message |
| 4 | eCommand | BS_IDENTIFY_REPLY |
| 2 | nVersion | Version number (set to 2) |
| 4 | nCorrelation | Correlation from Request |
| 2 | eStatus | SC_SUCCESS, SC_FAILURE |
| 6 | achMAC | |
| 20 | szGroupName | |
| 15 | szSNumber | ie "S42 069.020*02" |
| 4 | m_nNumberOfIpAddrs | Number of entries in IP-ADDR list (addrs) |
| 4 | m_nNumberOfIdentify-Structs | Number of Servers in the server list |
| + | m_achIpAddrs | Sequence of 4byte ip-addrs (dotted quad) |
| + | {sIdentifyStruct2}+ | List of server-types & port-numbers |

SetBroadCastList [UDP]

| Length | Field | Comment |
|---|---|---|
| | | Request |
| 4 | nMessageLength | Length of the message |
| 4 | eCommand | BS_BROADCAST_LIST_REQUEST |
| 2 | nVersion | Version number (set to 2) |
| 4 | nCorrelation | Correlation to be returned by reply |
| 2 | achAppendToList | 0- Delete the old list and use this list 1- If this show be appended to the old list |
| 4 | nNumberOfMasks | Number of elements in list |
| + | {BroadCastAddress}* | BroadCastAddress is an 4 bytes integer denoting the IP broadcast address |
| + | szGroup | Zero terminated string containing group name for the broadcast servers that are to be updated. If group is an empty string, all Broadcast servers are updated. |
| Reply (Currently this reply is not sent, since we have no use for it. It is defined here for expansion reasons only) | | |
| 4 | NMessageLength | Length of the message |
| 4 | ECommand | BS_BROADCAST_LIST_REPLY |
| 2 | NVersion | Version number (set to 2) |
| 4 | NCorrelation | Correlation from Request |
| 2 | EStatus | SC_SUCCESS, SC_FAILURE |

Comments
NOT SENT BY THE BROADCAST SERVER WHEN A SetBroadcastList- REQUEST IS RECEIVED!

SetConfiguration

| Length | Field | Comment |
|---|---|---|
| | | Request |
| 4 | nMessageLength | Length of the message |
| 4 | eCommand | CI_SET_CONFIGURATION_REQUEST |
| 2 | nVersion | Version number (set to 2) |
| 4 | NCorrelation | Correlation to be returned by reply |
| + | SzCfgData | Zero terminated ASCII data |
| | | Reply |
| 4 | NMessageLength | Length of the message |
| 4 | ECommand | CI_SET_CONFIGURATION_REPLY |
| 2 | NVersion | Version number (set to 2) |
| 4 | NCorrelation | Correlation from Request |
| 2 | EStatus | SC_SUCCESS, SC_FAILURE |

-continued

| Length | Field | Comment |
|---|---|---|
| + | SzSyntaxCheck | Zero terminated ASCII data containing result of syntax check performed on received configuration data. |

Comments

This command is available after the user has successfully logged in, also, the request will fail if the CanGetConfiguration-attribute in the database is set to "No". In its default setting the database only permits the Administrator (UID 0), to perform this action. The request will always be sent in encrypted form GetConfiguration

| Length | Field | Comment |
|---|---|---|
| | | Request |
| 4 | NMessageLength | Length of the message |
| 4 | ECommand | CL_GET_CONFIGURATION_REQUEST |
| 2 | NVersion | Version number (set to 2) |
| 4 | NCorrelation | Correlation to be returned by reply |
| | | Reply |
| 4 | NMessageLength | Length of the message |
| 4 | ECommand | CL_GET_CONFIGURATION_REPLY |
| 2 | NVersion | Version number (set to 2) |
| 4 | NCorrelation | Correlation from Request |
| 2 | EStatus | SC_SUCCESS, SC_FAILURE |
| + | SzCfgData | Zero terminated ASCII data, holding the current configuration the Win32 Servers |

Comments

This command is available after the user has successfully logged in, also, the request will fail if the CanGetConfiguration-attribute in the database is set to "No". In its default setting the database only permits the Administrator (UID 0), to perform this action. The request will always be sent in encrypted form.

Billing

Introduction

This document describes the billing concept in different aspects, including using SafeCom in a public area (ex in a library).

The basic principle of billing is to tag a print job with additional data at submission time. These data could, for a lawyer point of view, be which client to bill the print job to. In other companies it could be which project the print job should be billed to.

Client Side

Figure 7:
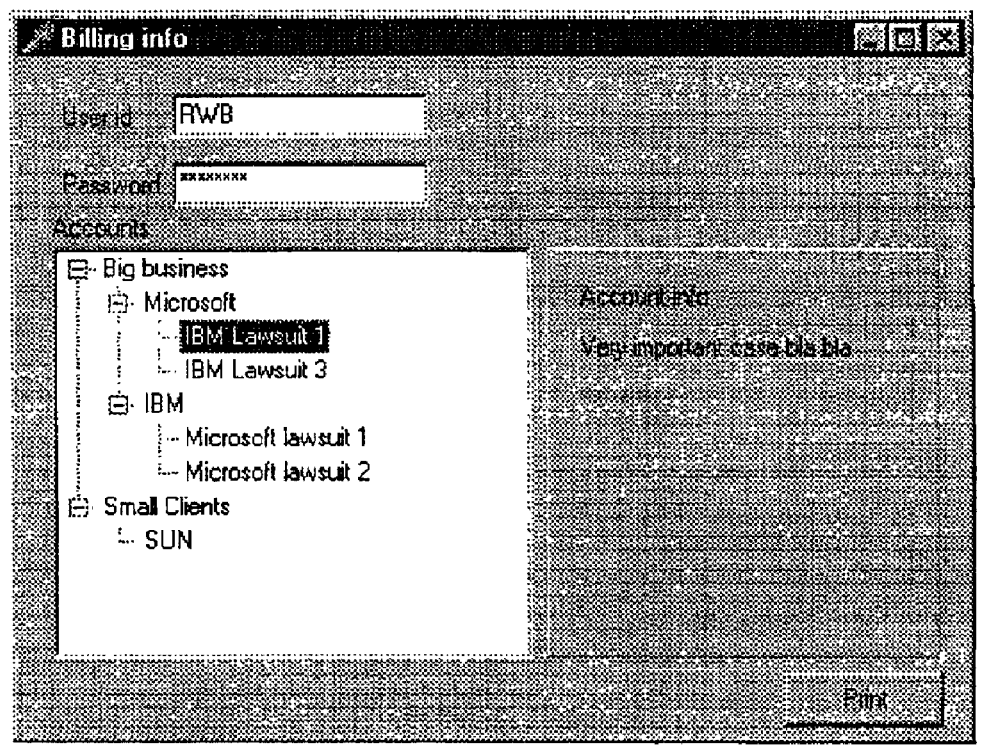
FIG. 7 shows the dialog box asking client which account to bill a print job to, which dialog box is displayed to the client every time he prints.

The client will, every time he prints, see a dialog shown in FIG. 7 asking him what account to bill the print job to. The accounts that will be presented to the client are collected from the server.

FIG. 7 gives an impression of the dialog that is presented to the client. As seen there are fields to identify the user. This will be optional and the way the user should identify himself is also configurable from the server. There are the following login possibilities:

Userid and password,
Card reader and pin
Network login.

The reason why it should be possible to configure login is that you can have public accessible computers where the user doesn't need to login to use the computer. So the only possible way to get the user information is at print time.

In areas like libraries billing info will not be needed, and the dialog can be configured not to show the billing info.
Items not shown:

A search possibility in the client dialog should be implemented which allow fast access for large billing info. It will also be possible to let the dialog remember the last selection. (Pass through print can also be selected here).

Server

The server holds the list or the tree of billing info that the client can access at print time. It would be necessary to have access-rights on the billing info, because in some firms they don't want all employees to know all possible accounts. The list or tree of billing info will be customizable, except for a fixed billing info called personal (not shown above).

The assigning of access rights implicates a need for creating groups of users with different access rights, so in large organization it would be easy to assign access rights to the billing info.

On the server each user shall have an attribute describing the login procedure for submitting print jobs.

User login attribute: Network, card, password.

Printing and Data Extracting

Printing and collecting accounting info will be done in same way as described in the RS. The only difference is the billing info, which will appear in the accounting database.

What is claimed is:

1. A printing control system for ensuring one or more users of a network (such as a LAN: local area network, or a WAN: wide area network) secure access to a print job designated to said one or more users of said network, and said printing control system comprising:

(a) a client station of a first plurality of client stations for designating said print job to said one or more users, said print job defining a document containing user readable information and defining a header containing document access information, (b) a spool connected to said client station for spooling of said document and substituting said document in said print job with a spooled document, (c) a job database connected to said spool for receiving said spooled document and said header from said client station, said job database defining a document table and a user table and storing said spooled document in said document table and storing said header in said user table, (d) a printer communication unit of a second plurality of printer communication units for receiving user identifying data input by said one or more users to said printer communication unit said printer communication unit comprising a front-end module for identifying said one or more users of said network and a control unit for providing an interface for a print engine and a server to a printer, said front end module comprising an iris scanner and/or a fingerprint reader for identifying said one or more users at said front-end module and/or a card reader for reading card information from a card such as a credit card, a library card, a health insurance card, a driving licence card, a passport card, a membership card, a company identity card or an institutional identity card, said card information including information such as card user name, card user ID, card user credit, card user's access rights, card user's server address, card user identifying number, card issuing date, card identity number, digital signature of one or more of said client station of said first plurality of client stations or any combination thereof, and wherein said card utilizes electronic storage techniques, electromagnetic storage techniques, magnetic storage techniques, magneto-optic storage techniques, optic storage techniques or any combination thereof for storing of said card information, (e) a server managed by a network administrator and interconnecting said printer communication unit to said job database for establishing said one or more users in said user table enabling said one or more users access to said network, for validating said one or more users on the basis of said user identifying data input to said printer communication unit against user information stored in said user table, and for ensuring said user identifying data and said user information provide said one or more users access to said spooled document, (f) a printer connected to said printer communication unit for receiving said spooled document from said job database and having a request input for receiving a print request from said one or more users and communicating said print request to said server, and (g) a print engine interconnecting said job database and said printer communication unit for compiling of said spooled document to be communicated to said printer through said printer communication unit, said print engine receiving said spooled document from said document table in said job database.

2. A printing control system according to claim 1, wherein said network is established by bus connections, by cable connections such as current carrying cables and/or optical cables, by wireless links such as mobile radio transmission links, infra-red transmission links or ultra-sonic transmission links, or by any combination thereof.

3. A printing control system according to claim 1, wherein said document is constituted by a file configured in any binary format such as text format, comma or space separated variable format or any user or software defined format.

4. A printing control system according to claim 1, wherein each of said first plurality of client stations comprise a local memory, a display, a keyboard and preferably a local central processing unit such as constituted by personal computers, computer workstations and/or such as constituted by mobile communication clients like mobile phones or mobile communicators or any combinations thereof.

5. A printing control system according to claim 1, wherein said spool spools said document according to a data stream format such as to PostScript, PDF, IPDS, PCL, PCLXL or AFP format.

6. A printing control system according to claim 1, wherein said printing control system establishing a secure network by utilising secure networking procedures providing symmetrical and/or asymmetrical encryption in accordance with public and/or private encryption keys.

7. A printing control system according to claim 1, wherein said spool incorporates a port monitor for parsing said spooled document in order to determine data stream format such as PostScript, PDF, IPDS, PCL, PCLXL or AFP format, and further to determine print formats such as simplex, duplex, colour, page size, page rotation, tray, stapling, and number of pages said spooled document will constitute during printing of said spooled document.

8. A printing control system according to claim 1, wherein said job database is established on a memory storage unit accessible by said server such as magnetic storable hard disk, magnetic storable tape and/or magneto-optic storage disks on said server and having said user table and said document table allocated in storage spaces on said memory storage unit.

9. A printing control system according to claim 8, wherein said user table allocates a record space in said memory storage unit for said header, and said document table allocates a storage space in said memory storage unit for said spooled document.

10. A printing control system according to claim 8, wherein said user table allocates a record space in said memory storage unit for said header, and said document table allocates a storage spaced in said memory storage unit for a pointer to said spooled document on said local memory of said client station or in said document table.

11. A printing control system according to claim 1, wherein said header contains information such as information regarding data stream format such as PostScript, PDF, IPDS, PCL, PCLXL or AFP format, print formats such as simplex, duplex, colour, page size, page rotation, tray, stapling, number of pages of said spooled document, access for said one or more users to said spooled document, a digital client signature, duration in which said one or more users is allowed access to said spooled document, and number of pages defined by said spooled document or any combination thereof.

12. A printing control system according to claim 1, wherein said server incorporates said spool, said job database and said print engine in a server memory.

13. A printing control system according to claim 1, wherein said front-end module comprises a display for showing said one or more users accessible print jobs and operations menus, and comprises a keypad for providing an interface between said one or more users and said front-end.

14. A printing control system according to claim 13, wherein said display utilising cathode-ray tube screen techniques or said display utilising liquid crystal display techniques.

15. A printing control system according to claim 13, wherein said keypad is constituted by a general personal computer keyboard, a numerical keypad or a functional keypad.

16. A printing control system according to claim 13, wherein said keypad is constituted by a touch sensitive film mounted on said display so as to allow said one or more users to perform user operations by pressing said touch sensitive film in accordance with information showed on said display.

17. A printing control system according to claim 1, wherein said control unit communicates with said front-end module and said printer through a parallel connection, a serial connection, a local area network (LAN) connection, a wireless connection such as a mobile radio transmission connection, an infra-red transmission connection or an ultra-sonic transmission connection, or any combination thereof.

18. A printing control system for ensuring one or more users of a network (such as a LAN: local area network, or a WAN: wide area network) secure access to a print job designated to said one or more users of said network, and said printing control system comprising:

(a) a client station of a first plurality of client stations for designating said print job to said one or more users, said print job defining a document containing user readable information and defining a header containing document access information, (b) a spool connected to said client station for spooling of said document and substituting said document in said print job with a spooled document, (c) a job database connected to said spool for receiving said spooled document and said header from said client station, said job database defining a document table and a user table and storing said spooled document in said document table and storing said header in said user table, (d) a printer communication unit of a second plurality of printer communication units for receiving user identifying data input by said one or more users to said printer communication unit, said printer communication unit comprising a front-end module for identifying said one or more users of said network and a control unit for providing an interface for a print engine and a server to a printer, said front end module comprising an iris scanner and/or a fingerprint reader for identifying said one or more users at said front-end module and/or a card reader for reading card information from a card such as a credit card, a library card, a health insurance card, a driving licence card, a passport card, a membership card, a company identity card or an institutional identity card, said card information including information such as card user name, card user ID, card user credit, card user's access rights, card user's server address, card user identifying number, card issuing date, card identity number, digital signature of one or more of said client station of said first plurality of client stations or any combination thereof, wherein said user identifying data includes said card information and a first user pin code and wherein said user information stored in said user table includes system user name, system user ID, system user credit, system user's access rights, system user's server address, system user identifying number, system user PUK code, system user initiation date or any combination thereof, and a second user pin code, (e) a server managed by a network administrator and interconnecting said printer communication unit to said job database for establishing said one or more users in said user table enabling said one or more users access to said network, for validating said one or more users on the basis of said user identifying data input to said printer communication unit against user information stored in said user table, and for ensuring said user identifying data and said user information provide said one or more users access to said spooled document, (f) a printer connected to said printer communication unit for receiving said spooled document from said job database and having a request input for receiving a print request from said one or more users and communicating said print request to said server, and (g) a print engine interconnecting said job database and said printer communication unit for compiling of said spooled document to be communicated to said printer through said printer communication unit, said print engine receiving said spooled document from said document table in said job database.

19. A printing control system for ensuring one or more users of a network (such as a LAN: local area network, or a WAN: wide area network) secure access to a print job designated to said one or more users of said network, and said printing control system comprising:

(a) a client station of a first plurality of client stations for designating said print job to said one or more users, said print job defining a document containing user readable information and defining a header containing document access information, (b) a spool connected to said client station for spooling of said document and substituting said document in said print job with a spooled document, (c) a job database connected to said spool for receiving said spooled document and said header from said client station, said job database defining a document table and a user table and storing said spooled document in said document table and storing said header in said user table, (d) a printer communication unit of a second plurality of printer communication units for receiving user identifying data input by said one or more users to said printer communication unit, said printer communication unit comprising a front-end module for identifying said one or more users of said network and a control unit for providing an interface for a print engine and a server to a printer, said front end module comprising an iris scanner and/or a fingerprint reader for identifying said one or more users at said front-end module and/or a card reader for reading card information from a card such as a credit card, a library card, a health insurance card, a driving licence card, a passport card, a membership card, a company identity card or an institutional identity card, said card information including information such as card user name, card user ID, card user credit, card user's access rights, card user's server address, card user identifying number, card issuing date, card identity number, digital signature of one or more of said client station of said first plurality of client stations or any combination thereof, wherein said card reader receives said card information from said card and communicates said card information to said server and said front-end module requests a first user pin code from said one or more users, (e) a server managed by a network administrator and interconnecting said printer communication unit to said job database for establishing said one or more users in said user table enabling said one or more users access to said network, for validating said one or more users on the basis of said user identifying data input to said printer communication unit against user information stored in said user table, and for ensuring said user identifying data and said user information provide said one or more users access to said spooled document, (f) a printer connected to said printer communication unit for receiving said spooled document from said job database and having a request input for receiving a print request from said one or more users and communicating said print request to said server, and (g) a print engine interconnecting said job database and said printer communication unit for compiling of said spooled document to be communicated to said printer through said printer communication unit, said print engine receiving said spooled document from said document table in said job database.

20. A printing control system for ensuring one or more users of a network (such as a LAN: local area network, or a WAN: wide area network) secure access to a print job designated to said one or more users of said network, and said printing control system comprising:

(a) a client station of a first plurality of client stations for designating said print job to said one or more users, said print job defining a document containing user readable information and defining a header containing document access information, (b) a spool connected to said client station for spooling of said document and substituting said document in said print job with a spooled document, (c) a job database connected to said spool for receiving said spooled document and said header from said client station, said job database defining a document table and a user table and storing said spooled document in said document table and storing said header in said user table, (d) a printer communication unit of a second plurality of printer communication units for receiving user identifying data input by said one or more users to said printer communication unit, said printer communication unit comprising a front-end module for identifying said one or more users of said network and a control unit for providing an interface for a print engine and a server to a printer, said front end module comprising an iris scanner and/or a fingerprint reader for identifying said one or more users at said front-end module and/or a card reader for reading card information from a card such as a credit card, a library card, a health insurance card, a driving licence card, a passport card, a membership card, a company identity card or an institutional identity card, said card information including information such as card user name, card user ID, card user credit, card user's access rights, card users server address, card user identifying number, card issuing date, card identity number, digital signature of one or more of said client station of said first plurality of client stations or any combination thereof, (e) a server managed by a network administrator and interconnecting said printer communication unit to said job database for establishing said one or more users in said user table enabling said one or more users access to said network, for validating said one or more users on the basis of said user identifying data input to said printer communication unit against user information stored in said user table, and for ensuring said user identifying data and said user information provide said one or more users access to said spooled document, wherein said server establishes and validates said one or more users by identifying said user information in said user table on the basis of said user identifying data and by matching said first pin code with said second pin code or alternatively during first use of said card by matching said system user PUK code with an entered user PUK code and said server locating in said document table all print jobs designated for said one or more users and communicating titles of all print jobs designated for said one or more users to said front-end display enabling said one or more users to select a print job or a multiplicity of print jobs, (f) a printer connected to said printer communication unit for receiving said spooled document from said job database and having a request input for receiving a print request from said one or more users and communicating said print request to said server, and (g) a print engine interconnecting said job database and said printer communication unit for compiling of said spooled document to be communicated to said printer through said printer communication unit, said print engine receiving said spooled document from said document table in said job database.

21. A printing control system according to claim 1, wherein said server receives a print job selection from said one or more users at said front-end module and said server providing said one or more users access to said spooled document in said document table in said job database upon validation of said user identifying data.

22. A printing control system for ensuring one or more users of a network (such as a LAN: local area network, or a WAN: wide area network) secure access to a print job designated to said one or more users of said network, and said printing control system comprising:

(a) a client station of a first plurality of client stations for designating said print job to said one or more users, said print job defining a document containing user readable information and defining a header containing document access information, (b) a spool connected to said client station for spooling of said document and substituting said document in said print job with a spooled document, (c) a job database connected to said spool for receiving said spooled document and said header from said client station, said job database defining a document table and a user table and storing said spooled document in said document table and storing said header in said user table, (d) a printer communication unit of a second plurality of printer communication units for receiving user identifying data input by said one or more users to said printer communication unit, said printer communication unit comprising a front-end module for identifying said one or more users of said network and a control unit for providing an interface for a print engine and a server to a printer, said front-end module comprising a display for showing said one or more users accessible print jobs and operations menus, and comprising a keypad for providing an interface between said one or more users and said front-end module, (e) a server managed by a network administrator and interconnecting said printer communication unit to said job database for establishing said one or more users in said user table enabling said one or more users access to said network, for validating said one or more users on the basis of said user identifying data input to said printer communication unit against user information stored in said user table, and for ensuring said user identifying data and said user information provide said one or more users access to said spooled document, (f) a printer connected to said printer communication unit for receiving said spooled document from said job database and having a request input for receiving a print request from said one or more users and communicating said print request to said server, (g) a print engine interconnecting said job database and said printer communication unit for compiling of said spooled document to be communicated to said printer through said printer communication unit, said print engine receiving said spooled document from said document table in said job database, and wherein said server provides an opportunity for said one or more users to delete said spooled document from said one or more users' print job list, determine desired number of copies required of said spooled document, retaining printing of said spooled document in a draft version for a first price, view said spooled document on said display for a second price, print said spooled document on said printer for a third price and terminate further operations on said front-end module.

23. A printing control system according to claim 22, wherein said server deducts said credit of said one or more users of a first amount equal to said first price if said one or more users prints a draft version of said spooled document, a second amount equal to said second price if said one or more users views said spooled document and a third amount equal to said third price if said one or more users prints said spooled document, or said server establishing a client credit record for each of said client stations designating said one or more users deducts said client credit record of a first amount equal to said first price if said one or more users prints a draft version of said spooled document, a second amount equal to said second price if said one or more users views said spooled document and a third amount equal to said third price if said one or more users prints said spooled document.

24. A printing control system according to claim 1, wherein said printer communication unit is constituted by a personal computer, a work station, a mobile communicator or a mobile phone.

* * * * *